US011681286B2

(12) United States Patent
Sannodo et al.

(10) Patent No.: US 11,681,286 B2
(45) Date of Patent: Jun. 20, 2023

(54) REMOTE MOVEMENT SYSTEM AND OPERATION TERMINAL

(71) Applicant: TOYOTA JIDOSHA KABUSHIKI KAISHA, Toyota (JP)

(72) Inventors: Shinya Sannodo, Toyota (JP); Naoya Matsunaga, Nagoya (JP); Keisuke Oyama, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 450 days.

(21) Appl. No.: 16/571,755

(22) Filed: Sep. 16, 2019

(65) Prior Publication Data

US 2020/0218249 A1 Jul. 9, 2020

(30) Foreign Application Priority Data

Jan. 8, 2019 (JP) ............................ JP2019-001150

(51) Int. Cl.
*G05D 1/00* (2006.01)
*B60W 30/06* (2006.01)
(Continued)

(52) U.S. Cl.
CPC ........... *G05D 1/0016* (2013.01); *B60W 30/06* (2013.01); *B60W 50/14* (2013.01); *B62D 1/00* (2013.01);
(Continued)

(58) Field of Classification Search
CPC ... G05D 1/0016; G05D 1/0223; B60W 30/06; B60W 50/14; B60W 2050/146; B62D 15/0285; G06F 3/0484; G06F 3/0488
See application file for complete search history.

(56) References Cited

U.S. PATENT DOCUMENTS 10,120,561 B2 * 11/2018 Stewart ............... G06F 3/04883
2011/0271181 A1 * 11/2011 Tsai .................... G06F 3/04883 715/702

(Continued)

FOREIGN PATENT DOCUMENTS

CN 105408853 A 3/2016
CN 108819939 A 11/2018

(Continued)

OTHER PUBLICATIONS

A. Broggi, S. Debattisti, P. Grisleri and M. Panciroli, "The deeva autonomous vehicle platform," 2015 IEEE Intelligent Vehicles Symposium (IV), 2015, pp. 692-699, doi: 10.1109/IVS.2015.7225765. (Year: 2015).*

*Primary Examiner* — James T Tsai
(74) *Attorney, Agent, or Firm* — Sughrue Mion, PLLC

(57) ABSTRACT

A remote movement system of the invention comprises an operation terminal and a vehicle electronic control unit. The operation terminal includes a touch sensing portion which senses a finger of a user touching the touch sensing portion and a terminal electronic control unit configured to transmit a control execution command for requesting an execution of a remote movement control to cause a vehicle to move to a target position when movement of the user's finger touching the touch sensing portion satisfies a predetermined touch interaction condition. The vehicle electronic control unit is provided in the vehicle and configured to execute the remote movement control in response to receiving the control execution command from the terminal electronic control unit. The predetermined touch interaction condition does not include a condition that the user's finger moves, touching the touch sensing portion along a predetermined specific path.

15 Claims, 23 Drawing Sheets

(51) Int. Cl.

| | |
|---|---|
| ***B62D 15/02*** | (2006.01) |
| ***G05D 1/02*** | (2020.01) |
| ***G06F 3/0488*** | (2022.01) |
| ***G06F 3/0484*** | (2022.01) |
| ***B60W 50/14*** | (2020.01) |
| ***B62D 1/00*** | (2006.01) |

(52) U.S. Cl.
CPC ....... *B62D 15/0285* (2013.01); *G05D 1/0223* (2013.01); *G06F 3/0484* (2013.01); *G06F 3/0488* (2013.01); *B60W 2050/146* (2013.01)

(56) References Cited

U.S. PATENT DOCUMENTS

| | | | | |
|---|---|---|---|---|
| 2013/0226380 | A1 | 8/2013 | Ando et al. | |
| 2013/0300704 | A1* | 11/2013 | Takahashi | G06F 3/0488 345/173 |
| 2014/0071075 | A1 | 3/2014 | Yamamoto | |
| 2014/0121883 | A1* | 5/2014 | Shen | B62D 15/0285 701/28 |
| 2015/0309668 | A1* | 10/2015 | Sun | G06F 3/04845 715/783 |
| 2016/0170494 | A1 | 6/2016 | Bonnet et al. | |
| 2018/0058879 | A1* | 3/2018 | Tayama | B60W 30/12 |
| 2018/0362023 | A1* | 12/2018 | Kim | B60W 50/14 |
| 2019/0018404 | A1 | 1/2019 | Bourassi et al. | |
| 2019/0212910 | A1* | 7/2019 | Abt | G06F 3/0482 |
| 2019/0256139 | A1* | 8/2019 | Ziebart | B62D 15/029 |
| 2019/0382248 | A1* | 12/2019 | Norstad | B66D 1/485 |
| 2020/0041992 | A1* | 2/2020 | Nagashima | G06F 3/04817 |
| 2020/0156625 | A1* | 5/2020 | Kogure | G06K 9/00812 |
| 2020/0247652 | A1* | 8/2020 | Okamoto | B66F 9/07581 |

FOREIGN PATENT DOCUMENTS

| | | | |
|---|---|---|---|
| JP | 2013-177026 | A | 9/2013 |
| JP | 2014-056487 | A | 3/2014 |
| JP | 2016-538780 | A | 12/2016 |
| JP | 2018-101226 | A | 6/2018 |
| JP | 2018-130978 | A | 8/2018 |
| JP | 2018-131201 | A | 8/2018 |
| WO | 2017/125514 | A1 | 7/2017 |

* cited by examiner

REMOTE MOVEMENT SYSTEM AND OPERATION TERMINAL

BACKGROUND

Field

The invention relates to a remote movement system and an operation terminal for causing a vehicle to move automatically by a remote control.

Description of the Related Art

There is known a remote parking system for executing a remote parking control for automatically parking a vehicle in a predetermined parking space in response to a user operating a portable operation terminal without a driving operation of a driver of the vehicle (see JP 2018-130978 A).

Recently, the operation terminals provided with a display which can sense a portion of the display that the user touch spread. The user can cause the remote movement system to execute the remote parking control by performing touch interaction to touch the display of the operation terminal.

In general, a condition is set as to the user's touch interaction for causing the remote movement system to execute the remote parking control. For example, the condition may be set to a condition that a user's finger moves, touching the display along a predetermined specific path. In this case, the user needs to move the finger on the display along the predetermined specific path. In this regard, it is bothersome for the user to perform the touch interaction for causing the remote movement system to execute the remote parking control.

SUMMARY

The invention has been made for solving problems described above. An object of the invention is to provide a remote movement system that the user can cause the remote movement system to execute a remote movement control to cause a vehicle to move without the driving operation performed by the driver of the vehicle with easy user's touch interaction on the operation terminal.

In addition, another object of the invention is to provide the operation terminal on which the user can easily perform the touch interaction.

A remote movement system according to the invention comprise an operation terminal and a vehicle electronic control unit.

The operation terminal includes a touch sensing portion and a terminal electronic control unit. The touch sensing portion senses a finger of a user touching the touch sensing portion. The terminal electronic control unit is configured to transmit a control execution command for requesting an execution of a remote movement control to cause a vehicle to move to a target position when movement of the user's finger touching the touch sensing portion satisfies a predetermined touch interaction condition.

The vehicle electronic control unit is provided in the vehicle. The vehicle electronic control unit is configured to execute the remote movement control in response to receiving the control execution command from the terminal electronic control unit.

The predetermined touch interaction condition does not include a condition that the user's finger moves, touching the touch sensing portion along a predetermined specific path.

With the remote movement system according to the invention, the predetermined touch interaction condition for causing the vehicle electronic control unit to execute the remote movement control does not include the condition that the user's finger moves, touching the touch sensing portion along the predetermined specific path. Thereby, the user can cause the vehicle electronic control unit to execute the remote movement control by freely moving the finger on touch sensing portion. Thus, the user can cause the vehicle electronic control unit to execute the remote movement control with the easy touch interaction.

Further, an operation terminal according to another invention comprises a touch sensing portion and a terminal electronic control unit.

The touch sensing portion senses a finger of a user touching the touch sensing portion.

The terminal electronic control unit is installed with a remote movement application software used to cause a vehicle electronic control unit to execute a remote movement control to cause a vehicle to move to a target position. The vehicle electronic control unit is provided in the vehicle. The vehicle electronic control unit is configured to execute the remote movement control in response to receiving a control execution command for requesting an execution of the remote movement control.

The remote movement application software is programmed to transmit the control execution command when movement of the user's finger touching the touch sensing portion satisfies a predetermined touch interaction condition other than a condition that the user's finger moves, touching the touch sensing portion along a predetermined specific path.

With the operation terminal according to the invention, the predetermined touch interaction condition for causing the vehicle electronic control unit to execute the remote movement control does not include the condition that the user's finger moves, touching the touch sensing portion along the predetermined specific path. Thus, the user can cause the vehicle electronic control unit to execute the remote movement control by freely moving the finger on the touch sensing portion. Thereby, the user can cause the vehicle electronic control unit to execute the remote movement control with the easy touch interaction.

In the remote movement system and the operation terminal according to an aspect of the invention, the predetermined touch interaction condition may include a condition that the user's finger moves, touching the touch sensing portion with at least one sharp curve.

The user's finger is unlikely to move, touching the touch sensing portion with the sharp curve when the user mistakenly touches the touch sensing portion with the finger. With the remoter movement system and the operation terminal according to this aspect of the invention, the predetermined touch interaction condition includes the condition that the user's finger moves, touching the touch sensing portion with the at least one sharp curve. In this case, the predetermined touch interaction condition is unlikely to be satisfied when the user mistakenly touches the touch sensing portion with the finger. Thereby, the user can be prevented from mistakenly causing the vehicle electronic control unit to execute the remote movement control.

In the remote movement system and the operation terminal according to another aspect of the invention, the predetermined touch interaction condition may include a condition that a distance of the movement of the user's finger touching the touch sensing portion for a predetermined length of time is equal to or longer than a predetermined distance.

The distance of the movement of the user's finger touching the touch sensing portion for the predetermined length of time is short when the user mistakenly touches the touch sensing portion with the finger. With the remote movement system and the operation terminal according to this aspect of the invention, the predetermined touch interaction condition includes the condition that the distance of the movement of the user's finger touching the touch sensing portion for the predetermined length of time is equal to or longer than the predetermined distance. In this case, the predetermined touch interaction condition is unlikely to be satisfied when the user mistakenly touches the touch sensing portion with the finger. Thereby, the user can be prevented from mistakenly causing the vehicle electronic control unit to execute the remote movement control.

In the remote movement system and the operation terminal according to further another aspect of the invention, the predetermined touch interaction condition may include a condition that a speed of the movement of the user's finger touching the touch sensing portion is maintained at a predetermined movement speed or more for a predetermined length of time or more.

The speed of the movement of the user's finger touching the touch sensing portion is likely to be maintained at the predetermined movement speed or more only for a short time when the user mistakenly touches the touch sensing portion with the finger. With the remote movement system and the operation terminal according to this aspect of the invention, the predetermined touch interaction condition includes the condition that the speed of the movement of the user's finger touching the touch sensing portion is maintained at the predetermined movement speed or more for the predetermined length of time or more. In this case, the predetermined touch interaction condition is unlikely to be satisfied when the user mistakenly touches the touch sensing portion with the finger. Thereby, the user can be prevented from mistakenly causing the vehicle electronic control unit to execute the remote movement control.

In the remote movement system according to further another aspect of the invention, the operation terminal may include a display which displays images. In this case, the terminal electronic control unit may be configured to display the image defining a predetermined area as the touch sensing portion at a lower area of the display. In addition, the terminal electronic control unit may be configured to display the image indicating information on the vehicle caused to move by the remote movement control as an information image at an upper area of the display.

In the operation terminal according to further another aspect of the invention, the operation terminal may include a display which displays images. In this case, the remote movement application software may be programmed to display the image defining a predetermined area as the touch sensing portion at a lower area of the display. In addition, the remote movement application software may be configured to display the image indicating information on the vehicle caused to move by the remote movement control as an information image at an upper area of the display.

With the remote movement system and the operation terminal according to these aspects of the invention, the information on the vehicle caused to move by the remote movement control is indicated on the display of the operation terminal. Thereby, the user can safely cause the vehicle electronic control unit to execute the remote movement control.

In the remote movement system according to further another aspect of the invention, the vehicle may be provided with at least one sensor for detecting at least one obstacle against the movement of the vehicle. In this case, the terminal electronic control unit may be configured to (i) display at least one sensor image indicating the at least one sensor detecting the obstacle by color different from the color used for displaying the images other than the at least one sensor image at the upper area of the display as a part of the information image or (ii) display the at least one sensor image indicating the at least one sensor detecting the obstacle at the upper area of the display as a part of the information image with blinking the at least one sensor image.

In the operation terminal according to further another aspect of the invention, the vehicle may be provided with at least one sensor for detecting at least one obstacle against the movement of the vehicle. In this case, the remote movement application software may be programmed to (i) display at least one sensor image indicating the at least one sensor detecting the obstacle by color different from the color used for displaying the images other than the at least one sensor image at the upper area of the display as a part of the information image or (ii) display the at least one sensor image indicating the at least one sensor detecting the obstacle at the upper area of the display as a part of the information image with blinking the at least one sensor image.

With the remote movement system and the operation terminal according to these aspects of the invention, the at least one sensor image detecting the obstacle is displayed at the upper area of the display by the color different from the color used for displaying the images other than the at least one sensor image when the at least one obstacle is detected by the at least one sensor. Alternatively, the at least one sensor image detecting the obstacle is blinked at the upper area of the display when the at least one obstacle is detected by the at least one sensor. Thereby, the user can safely cause the vehicle electronic control unit to execute the remote movement control.

In the remote movement system according to further another aspect of the invention, the terminal electronic control unit may be configured to display the image indicating a distance between the vehicle and the target position at the upper area of the display as a part of the information image.

In the operation terminal according to further another aspect of the invention, the remote movement application software may be programmed to display the image indicating a distance between the vehicle and the target position at the upper area of the display as a part of the information image.

With the remote movement system and the operation terminal according to these aspects of the invention, the image indicating the distance between the vehicle and the target position is displayed as a part of the information image. Thereby, the user can notice the distance between the vehicle and the target position.

In the remote movement system according to further another aspect of the invention, the terminal electronic control unit may be configured to stop transmitting the control execution command when the movement of the user's finger touching the touch sensing portion does not satisfy the predetermined touch interaction condition. In this case, the vehicle electronic control unit may be configured to stop causing the vehicle to move when the vehicle electronic control unit does not receive the control execution command from the terminal electronic control unit.

In the operation terminal according to further another aspect of the invention, the vehicle electronic control unit may be configured to stop causing the vehicle to move when the vehicle electronic control unit does not receive the control execution command from the terminal electronic control unit. In this case, the remote movement application software may be programmed to stop transmitting the control execution command when the movement of the user's finger touching the touch sensing portion does not satisfy the predetermined touch interaction condition.

The user must have no intention of causing the vehicle to move by the remote movement control when the predetermined touch interaction condition is not satisfied. In this case, the vehicle is preferably stopped. With the remote movement system and the operation terminal according to these aspects of the invention, the control execution command is not transmitted from the operation terminal when the predetermined touch interaction condition is not satisfied. Thereby, the vehicle can be stopped when the vehicle should be stopped.

In the remote movement system and the operation terminal according to further another aspect of the invention, the remote movement control may be at least one of (i) a control to set a parking space as the target position and park the vehicle (200) in the parking space set as the target position and (ii) a control to set a position other than the parking space as the target position and cause the vehicle (200) to move to the position set as the target position.

With the remote movement system and the operation terminal according to this aspect of the invention, the user can park the vehicle in the parking space or pull the vehicle out of the parking space automatically by the remote movement control.

In the remote movement system according to further another aspect of the invention, the terminal electronic control unit and the vehicle electronic control unit may be configured to wirelessly communicate with each other.

In the operation terminal according to further another aspect of the invention, the terminal electronic control unit may be configured to wirelessly communicate with the vehicle electronic control unit.

With the remote movement system and the operation terminal according to these aspects of the invention, the terminal electronic control and the vehicle electronic control unit can communicate with each other wirelessly. Thereby, the user can cause the vehicle to move automatically by execute the remote movement control by the operation terminal directly.

In the remote movement system according to further another aspect of the invention, the terminal electronic control unit may be configured to wirelessly communicate with Internet and communicate with a server provided in the internet via the Internet.

In the operation terminal according to further another aspect of the invention, the terminal electronic control unit may be configured to wirelessly communicate with internet and communicate with a server provided in the internet via the Internet.

With the remove movement system and the operation terminal according to these aspect of the invention, the terminal electronic control unit can communicate with the server. Thereby, the terminal electronic control unit can use the server for automatically moving the vehicle by the remote movement control.

In the remote movement system according to further another aspect of the invention, the vehicle electronic control unit may be configured to wirelessly communicate with Internet and communicate with a server provided in the Internet via the Internet.

With the remoter movement system according to this aspect of the invention, the vehicle electronic control can communicate with the server. Thereby, the vehicle electronic control can use the server for causing the vehicle to move automatically by the remote movement control.

Elements of the present invention are not limited to elements of embodiments of the invention. The other objects, features and accompanied advantages of the present invention can be easily understood from the description of the embodiments of the invention along with the drawings.

DESCRIPTION OF THE PREFERRED EMBODIMENTS

Below, a remote movement system according to an embodiment of the invention will be described with reference to the drawings. In particular, a remote parking/pulling-out system will be described as the remote movement system according to the embodiment of the invention. The remote parking/pulling-out system is a system for automatically parking a vehicle in a predetermined parking space with a remote control and automatically pulling the vehicle out of the predetermined parking space with the remote control by a user performing interaction on a portable operation terminal without a driver of the vehicle driving the vehicle.

In the following description, a parking process is a process to automatically park the vehicle in the predetermined parking space, and a pulling-out process is a process to automatically pull the vehicle out of the predetermined parking space. The remote movement system according to the invention may include a system for causing the vehicle to move to a predetermined place automatically with the remote control in addition to the remote parking/pulling-out system.

Figure 1:
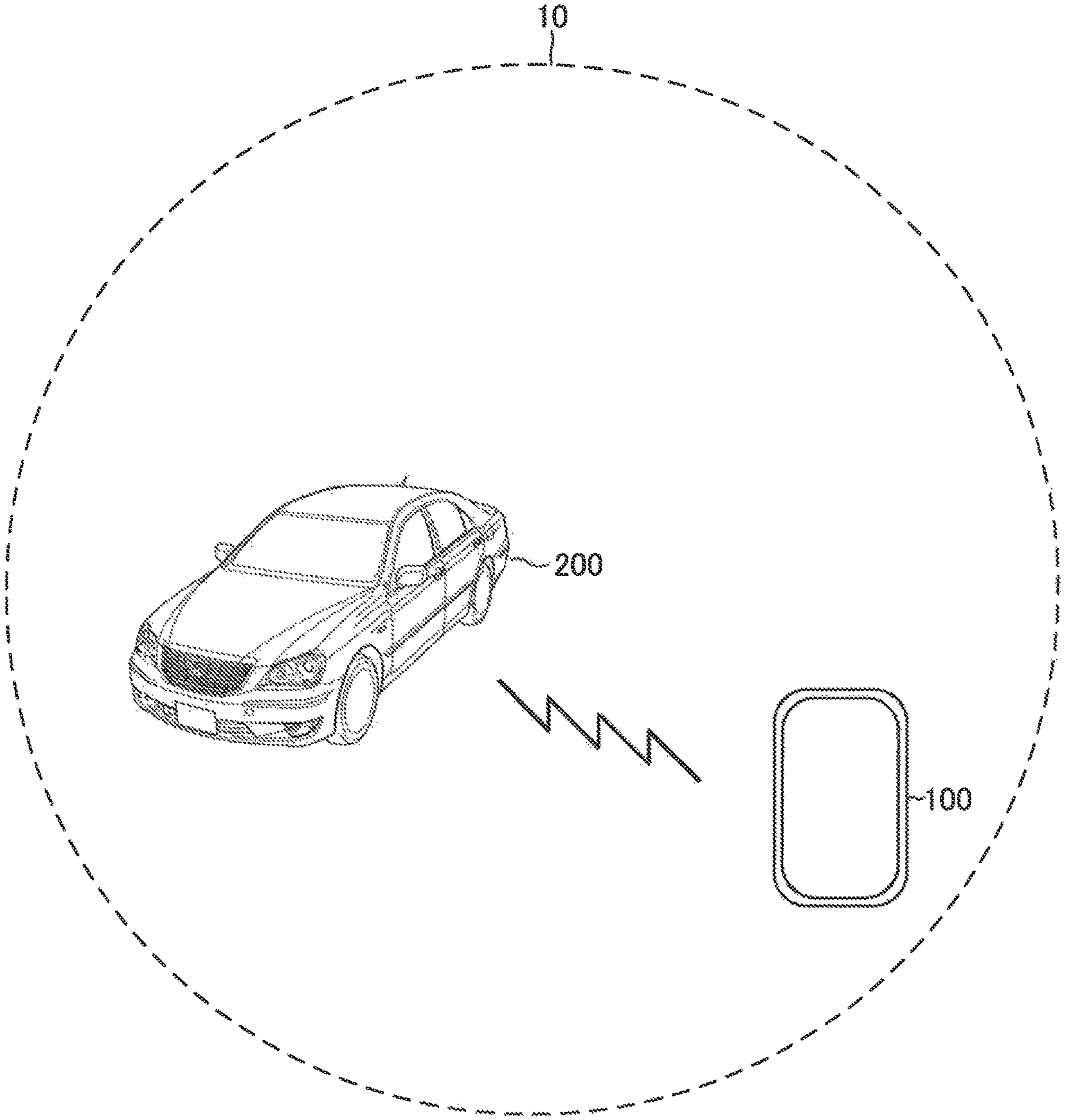
FIG. 1 is a view for showing a remote movement system according to an embodiment of the invention.

As shown in FIG. 1, the remote movement system 10 according to the embodiment of the invention includes an operation terminal 100 and a vehicle 200. In particular, the remote movement system 10 according to the embodiment of the invention includes the operation terminal 100 and an ECU 290 of the vehicle 200. Hereinafter, the remote movement system 10 according to the embodiment of the invention will be referred to as "the embodiment movement apparatus 10".

In this embodiment, the operation terminal 100 is a smartphone which is one of portable phones. In this regard, the operation terminal 100 may be a smart key or a dedicated terminal provided with a display having a function to sense a finger of a user of the remote movement system touching the display. In addition, a portion to sense the finger of the user touching may be a portion other than the display.

<Operation Terminal>

Figure 2:
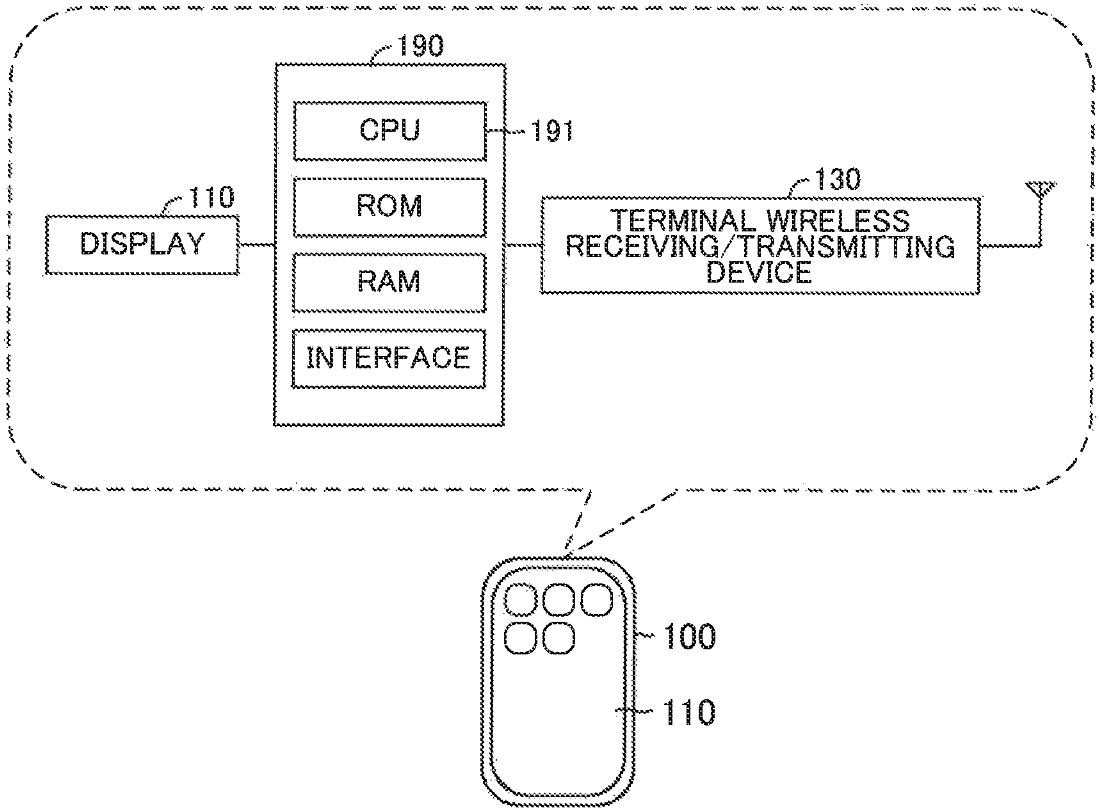
FIG. 2 is a view for showing an operation terminal, an ECU of the operation terminal, etc. included in the remote movement system shown in FIG. 1.

As shown in FIG. 2, the operation terminal 100 includes a display 110, a terminal wireless receiving/transmitting device 130, and an ECU 190. Hereinafter, the ECU 190 of the operation terminal 100 will be referred to as "the terminal ECU 190".

The display 110 indicates various images described later. The display 110 is electrically connected to the terminal ECU 190. The terminal ECU 190 controls indications of the images on the display 110.

The terminal wireless receiving/transmitting device 130 is electrically connected to the terminal ECU 190. The terminal wireless receiving/transmitting device 130 transmits various signals generated by the terminal ECU 190 to an outside of the operation terminal 100. In addition, the terminal wireless receiving/transmitting device 130 receives various signals transmitted by the ECU 290 of the vehicle 200 through a vehicle wireless receiving/transmitting device 279 to an outside of the vehicle 200. The terminal wireless receiving/transmitting device 130 sends the received signals from the ECU 290 of the vehicle 200 to the terminal ECU 190.

The terminal ECU 190 includes a microcomputer as a main component. The microcomputer includes a CPU 191, a ROM, a RAM, a non-volatile memory, an interface, etc. The CPU 191 realizes various functions by executing instructions, programs, and routines stored in the ROM.

A remote movement application software is installed in the terminal ECU 190. The remote movement application software is a software for causing the ECU 290 of the vehicle 200 to execute a remote movement control described later.

<Configuration of Vehicle>

Figure 3:
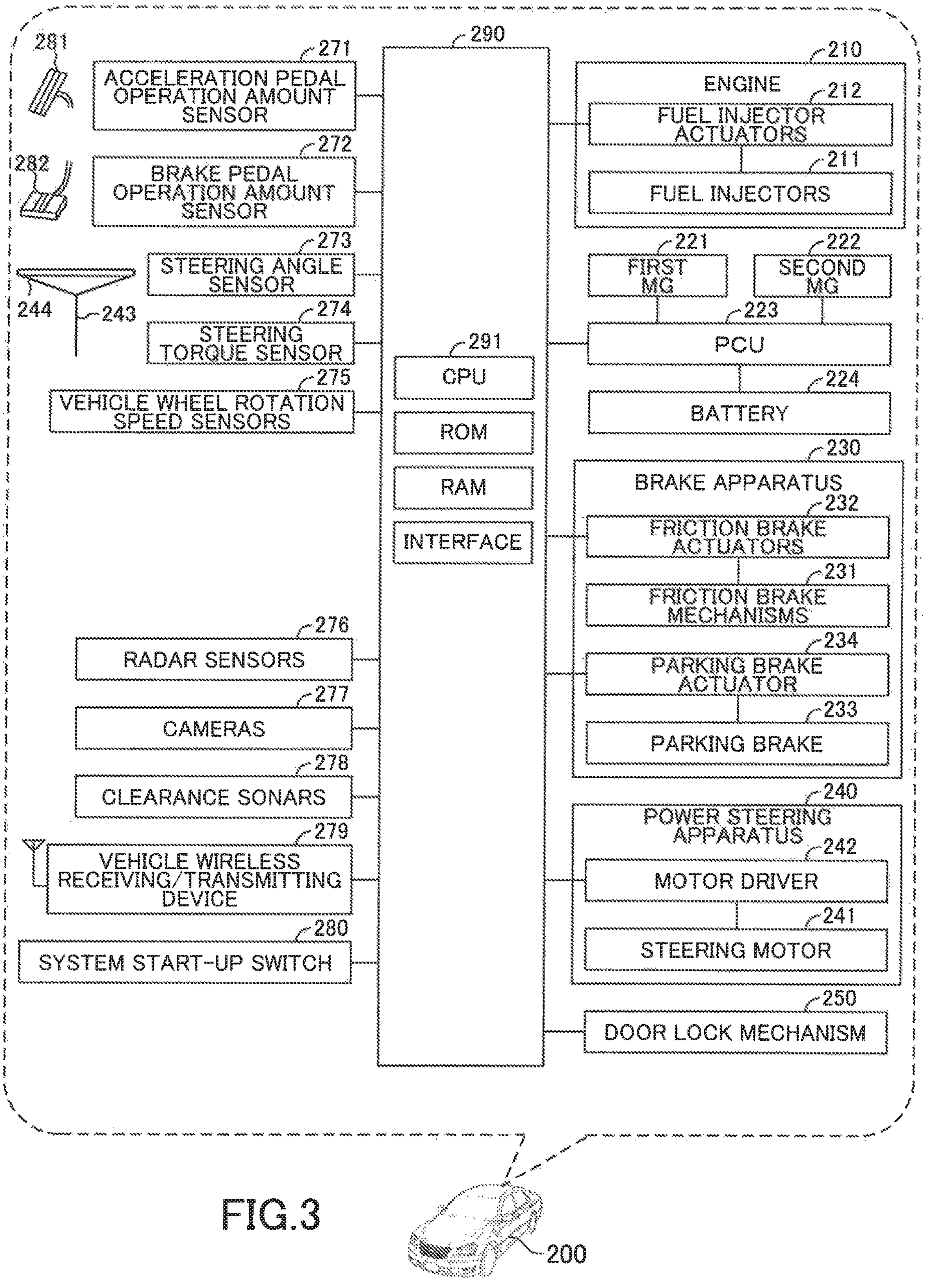
FIG. 3 is a view for showing a vehicle, an ECU of the vehicle, etc. included in the remote movement system shown in FIG. 1.

As shown in FIG. 3, the ECU 290 is provided in the vehicle 200. The ECU stands for an electronic control unit. The ECU 290 of the vehicle 200 includes a microcomputer as a main component. The microcomputer includes a CPU 291, a ROM, a RAM, a non-volatile memory, an interface, etc. The CPU 291 realizes various functions by executing instructions, programs, and routines stored in the ROM. Hereinafter, the ECU 290 of the vehicle 200 will be referred to as "the vehicle ECU 290".

As shown in FIG. 3, the vehicle 200 includes an internal combustion engine 210, a first motor generator 221, a second motor generator 222, a power control unit 223, a battery 224, a brake apparatus 230, a power steering apparatus 240, and a door lock mechanism 250.

In this embodiment, the vehicle 200 is a so-called plug-in hybrid vehicle (PHV). The plug-in hybrid vehicle is a vehicle which is driven by power output from at least one of (i) the engine 210, (ii) the first motor generator 221, and (iii) the second motor generator 222 and in which the battery 224 can be charged with electric power from an outside electric power source.

In this regard, the embodiment movement system 10 may be applied to a vehicle provided only with the internal combustion engine as a driving force source which supplies driving force to vehicle to drive the vehicle. Further, the embodiment movement system 10 may be applied to any one of (i) a so-called hybrid vehicle (HV) and (ii) a so-called electric vehicle (EV). The hybrid vehicle is a vehicle provided with (i) the internal combustion engine and (ii) at least one electric motor as the driving force source. The electric vehicle is a vehicle provided with at least one electric motor as the driving force source without the internal combustion engine.

Furthermore, the embodiment movement system 10 may be applied to a so-called fuel cell vehicle (FCV). The fuel cell vehicle is a vehicle provided with at least one electric motor as the driving force source. The electric motor is driven by the electric power generated by a fuel cell. Further, the embodiment movement system 10 may be applied to an in-wheel motor vehicle. The in-wheel motor vehicle is a vehicle provided with electric motors as the driving force source. The electric motors are provided, corresponding to wheels of the vehicle. Each wheel is driven by the respective electric motor.

<Internal Combustion Engine>

The engine 210 is the driven force source which supplies the driving force to the vehicle 200 to drive the vehicle 200. In this embodiment, the engine 210 is a known compression-ignition multi-cylinder internal combustion engine, i.e., a so-called diesel engine. In this regard, the engine 210 may be a known spark-ignition multi-cylinder internal combustion engine, i.e., a so-called gasoline engine.

The engine 210 includes combustion chambers (not shown), fuel injectors 211, fuel injector actuators 212, etc. Each fuel injector 211 injects fuel into the respective combustion chamber. Each fuel injector actuator 212 controls an activation of the respective fuel injector 211.

The fuel injector actuators 212 are electrically connected to the vehicle ECU 290. The vehicle ECU 290 controls an amount of the fuel injected from each fuel injector 211 by controlling an activation of the respective fuel injector actuator 212. The vehicle ECU 290 controls torque generated by the engine 210 by controlling the amount of the fuel injected from each fuel injector 211. The torque generated by the engine 210 increases as the amount of the fuel injected from each fuel injectors 211 increases. The torque generated by the engine 210 is transmitted to driven wheels of the vehicle 200 through a transmission (not shown) and a drive shaft (not shown).

A power output shaft (not shown) of the engine 210 is operatively connected to power division mechanism (not shown) described later. Power generated by the engine 210 is input into the power division mechanism.

<Motor Generators, Etc.>

The first and second motor generators 221 and 222 are permanent magnet synchronous electric motors, respectively. The first and second motor generators 221 and 222 are electrically connected to the battery 224 through the power control unit 223.

The power control unit 223 includes an inverter, a boost converter, a DC/DC converter, etc. Hereinafter, the power control unit 223 will be referred to as “the PCU 223”.

A rotation shaft of the first motor generator 221 is operatively connected to the power division mechanism. The first motor generator 221 is mainly used as an electric generator. When the first motor generator 221 is used as the electric generator, the rotation shaft is rotated to generate the electric power by movement energy of the vehicle 200 or outside force such as the power output from the engine 210. The generated electric power is charged in the battery 224 via the PCU 223. The first motor generator 221 is also used as an electric motor. When the first motor generator 221 is used as the electric motor, the first motor generator 221 is driven by the electric power supplied to the first motor generator 221 from the battery 224 via the PCU 223.

A rotation shaft of the second motor generator 222 is operatively connected to the power division mechanism. The second motor generator 222 is mainly used as the electric motor. When the second motor generator 222 is used as the electric motor, the second motor generator 222 is driven by the electric power supplied to the second motor generator 222 from the battery 224 via the PCU 223. The second motor generator 222 is also used as the electric generator. When the second motor generator 222 is used as the electric generator, the rotation shaft of the second motor generator 222 is rotated to generate the electric power by the movement energy of the vehicle 200 or the outside force such as the power output from the engine 210. The generated electric power is charged in the battery 224 via the PCU 223.

The power division mechanism is, for example, a planetary gear mechanism. When the first motor generator 221 is used as the electric generator, and the second motor generator 222 is used as the electric motor, the power division mechanism divides the power input into the power division mechanism from the engine 210 at a predetermined ratio into (i) the power transmitted to the driven wheels of the vehicle 200 to drive the vehicle 200 and (ii) the power transmitted to the first motor generator 221 to drive the first motor generator 221 as the electric generator. In addition, the power division mechanism transmits the power input thereinto from the second motor generator 222 to the driven wheels of the vehicle 200. The power division mechanism is, for example, known in JP 2013-177026 A.

As shown in FIG. 3, the PCU 223 is electrically connected to the vehicle ECU 290. An activation of the PCU 223 is controlled by the vehicle ECU 290. The vehicle ECU 290 controls activations of the first and second motor generators 221 and 222 by controlling the activation of the PCU 223.

<Brake Apparatus>

The brake apparatus 230 includes friction brake mechanisms 231, friction brake actuators 232, and hydraulic oil passages (not shown). The friction brake mechanisms 231 are provided, corresponding to the wheels of the vehicle 200, respectively. Each friction brake actuator 232 is provided to the respective friction brake mechanisms 231. Each hydraulic oil passage is provided to the respective friction brake actuator 232.

Each friction brake actuator 232 is fluidically connected to a brake caliper (not shown) of the respective friction brake mechanism 231 through the respective hydraulic oil passage. Each friction brake actuator 232 supplies hydraulic oil compressed by a master cylinder (not shown) to the respective friction brake mechanism 231 through the respective hydraulic oil passage. In particular, in this embodiment, each friction brake actuator 232 supplies the hydraulic oil compressed by the master cylinder to the brake caliper of the respective friction brake mechanism 231 through the respective hydraulic oil passage.

A brake pad (not shown) of the brake caliper of each friction brake mechanism 231 is pressed on a respective brake disc (not shown) when the hydraulic oil is supplied to each friction brake mechanism 231. Thereby, braking force is applied to each wheel of the vehicle 200.

The friction brake actuators 232 are electrically connected to the vehicle ECU 290. The vehicle ECU 290 controls a pressure of the hydraulic oil supplied to each friction brake mechanism 231 by controlling an activation of the respective friction brake actuator 232. The braking force applied to each wheel of the vehicle 200 increases as the pressure of the hydraulic oil supplied to each friction brake mechanism 231 increases.

The brake apparatus 230 includes a parking brake 233 and a parking brake actuator 234.

The parking brake actuator 234 is connected to the parking brake 233. The wheels of the vehicle 200 are locked by the parking brake 233 when the parking brake actuator 234 actuates the parking brake 233.

The parking brake actuator 234 is electrically connected to the vehicle ECU 290. The vehicle ECU 290 controls an activation of the parking brake 233 by controlling an activation of the parking brake actuator 234.

<Power Steering Apparatus>

The power steering apparatus 240 includes a steering motor 241, a motor driver 242, etc. The motor driver 242 is electrically connected to the steering motor 241. The steering motor 241 generates torque by electric power supplied from the motor driver 242. The steering motor 241 applies the generated torque to a steering shaft 243.

The motor driver 242 is electrically connected to the vehicle ECU 290. The vehicle ECU 290 controls the torque applied to the steering shaft 243 from the steering motor 241 by controlling an activation of the motor driver 242.

The door lock mechanism 250 is a mechanism for locking doors of the vehicle 200. The door lock mechanism 250 is electrically connected to the vehicle ECU 290. The vehicle ECU 290 controls an activation of the door lock mechanism 250. The door lock mechanism 250 locks the doors of the vehicle 200 when the vehicle ECU 290 activates the door lock mechanism 250. On the other hand, the door lock mechanism 250 unlocks the doors when the vehicle ECU 290 stops the activation of the door lock mechanism 250.

<Sensors, Etc.>

The vehicle 200 are provided with an acceleration pedal operation amount sensor 271, a brake pedal operation amount sensor 272, a steering angle sensor 273, a steering torque sensor 274, vehicle wheel rotation speed sensors 275, radar sensors 276, four cameras 277, twelve clearance sonars 278, and the vehicle wireless receiving/transmitting device 279.

The acceleration pedal operation amount sensor 271 is electrically connected to the vehicle ECU 290. The acceleration pedal operation amount sensor 271 detects an operation amount of an acceleration pedal 281 and sends a signal representing the detected operation amount to the vehicle ECU 290. The vehicle ECU 290 acquires the operation amount of the acceleration pedal 281 as an acceleration pedal operation amount AP, based on the signal sent from the acceleration pedal operation amount sensor 271.

The brake pedal operation amount sensor 272 is electrically connected to the vehicle ECU 290. The brake pedal operation amount sensor 272 detects an operation amount of a brake pedal 282 and sends a signal representing the detected operation amount to the vehicle ECU 290. The vehicle ECU 290 acquires the operation amount of the brake pedal 282 as a brake pedal operation amount BP, based on the signal sent from the brake pedal operation amount sensor 272.

The steering angle sensor 273 is electrically connected to the vehicle ECU 290. The steering angle sensor 273 detects a steered angle of any of left and right front wheels which are wheels to be steered of the vehicle 200 and sends a signal representing the detected steered angle to the vehicle ECU 290. The vehicle ECU 290 acquires the steered angle of any of the left and right front wheels of the vehicle 200 as a steering angle $\theta st$, based on the signal sent from the steering angle sensor 273.

The steering torque sensor 274 is electrically connected to the vehicle ECU 290. The steering torque sensor 274 detects a torque applied to the steering shaft 243 by an operation to a steering wheel 244 by the driver of the vehicle 200 and sends a signal representing the detected torque to the vehicle ECU 290. The vehicle ECU 290 acquires the torque applied to the steering shaft 243 as a driver steering torque TQdriver, based on the signal sent from the steering torque sensor 274.

The vehicle wheel rotation speed sensors 275 are electrically connected to the vehicle ECU 290. The vehicle wheel rotation speed sensors 275 are provided, corresponding to the wheels of the vehicle 200, respectively. Each vehicle wheel rotation speed sensor 275 detects a rotation speed of the respective wheel of the vehicle 200 and sends a signal representing the detected rotation speed to the vehicle ECU 290. The vehicle ECU 290 acquires the rotation speeds of the wheels of the vehicle 200, based on the signals sent from the vehicle wheel rotation speed sensors 275. In addition, the vehicle ECU 290 acquires a movement speed SPD of the vehicle 200, based on the acquired rotation speeds.

Figure 4:
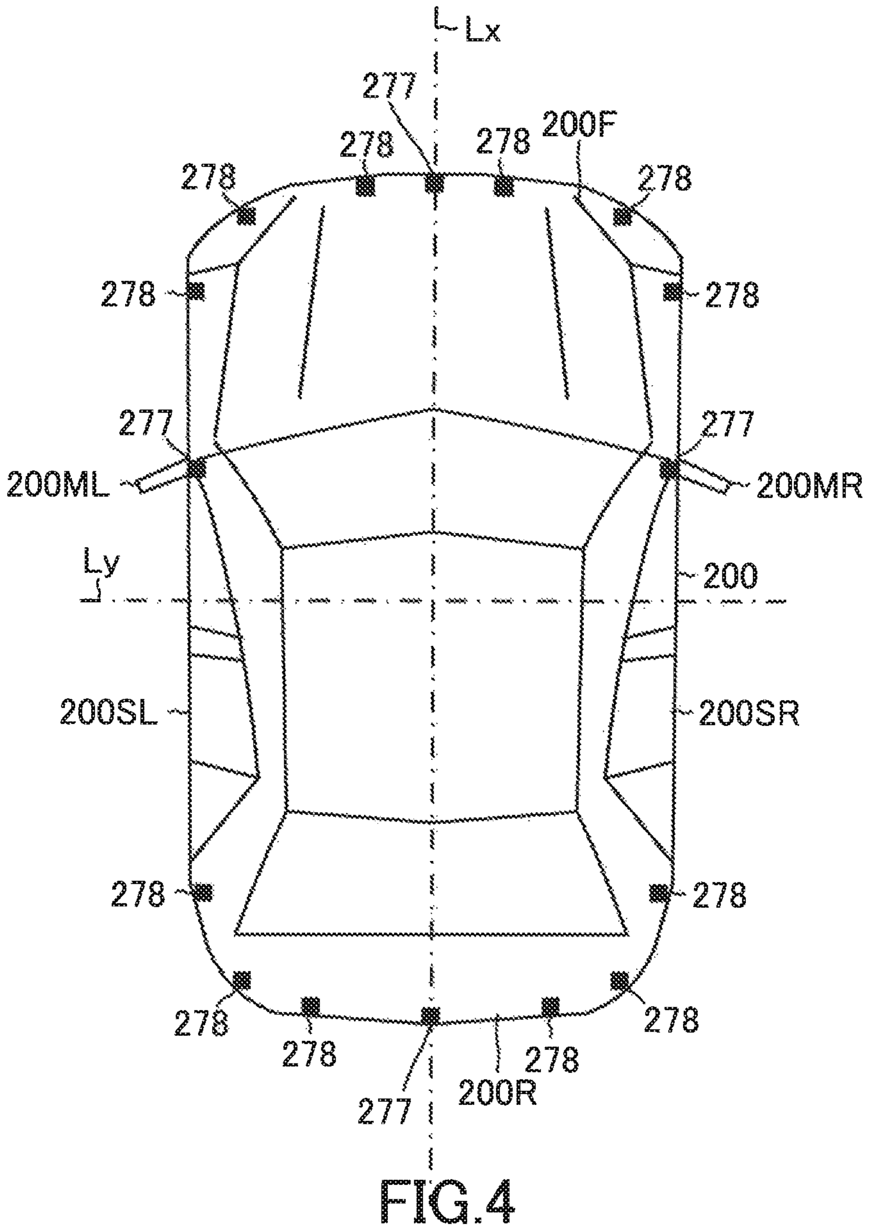
FIG. 4 is a view for showing the vehicle to which the remote movement system according to the embodiment of the invention is applied.

As shown in FIG. 4, one of the four cameras 277 is secured to a frontmost portion 200F of the vehicle 200 located on a widthwise center line Lx of the vehicle 200 so as to take an image of a view ahead of the vehicle 200. One of the remaining three cameras 277 is secured to a rearmost portion 200R of the vehicle 200 located on the widthwise center line Lx of the vehicle 200 so as to take an image of a view behind the vehicle 200. One of the remaining two cameras 277 is secured to a portion of the vehicle 200 located at a front side of a longitudinally center line Ly of the vehicle 200 and near a left sideview mirror 200ML of the vehicle 200 so as to take an image of a view on a left side of the vehicle 200. The remaining camera 277 is secured to a portion of the vehicle 200 located at the front side of the longitudinally center line Ly of the vehicle 200 and near a right sideview mirror 200MR of the vehicle 200 so as to take an image of a view on a right side of the vehicle 200.

The cameras 277 are electrically connected to the vehicle ECU 290. The cameras 277 send image data on the taken images of the views around the vehicle 200 to the vehicle ECU 290. The vehicle ECU 290 recognizes objects such as (i) vehicles, (ii) posts, and (iii) walking persons around the vehicle 200 and recognizes or acquires a relationship between the objects and the vehicle 200.

Four of the twelve clearance sonars 278 are secured to the frontmost portion 200F of the vehicle 200. Four of the remaining eight clearance sonars 278 are secured to the rearmost portion 200R of the vehicle 200. Two of the remaining four clearance sonars 278 are secured to a left portion 200SL of the vehicle 200. The remaining two clearance sonars 278 are secured to a right portion 200SR of the vehicle 200.

One of the four clearance sonars 278 secured to the frontmost portion 200F of the vehicle 200 is secured to a portion located at the left side of and near the widthwise center line Lx of the vehicle 200. One of the remaining three clearance sonars 278 secured to the frontmost portion 200F of the vehicle 200 is secured to a portion located at the left side of the widthwise center line Lx of the vehicle 200 and near a left end of the frontmost portion 200F of the vehicle 200 remote from the widthwise center line Lx. One of the remaining two clearance sonars 278 secured to the frontmost portion 200F of the vehicle 200 is secured to a portion located at the right side of and near the widthwise center line Lx of the vehicle 200. The remaining clearance sonar 278 secured to the frontmost portion 200F of the vehicle 200 is secured to a portion located at the right side of the widthwise center line Lx of the vehicle 200 and near a right end of the frontmost portion 200F of the vehicle 200 remote from the widthwise center line Lx.

One of the four clearance sonars 278 secured to the rearmost portion 200R of the vehicle 200 is secured to a portion located at the left side of and near the widthwise center line Lx of the vehicle 200. One of the remaining three clearance sonars 278 secured to the rearmost portion 200R of the vehicle 200 is secured to a portion located at the left side of the widthwise center line Lx of the vehicle 200 and near a left end of the rearmost portion 200R of the vehicle 200 remote from the widthwise center line Lx. One of the remaining two clearance sonars 278 secured to the rearmost portion 200R of the vehicle 200 is secured to a portion located at the right side of and near the widthwise center line Lx of the vehicle 200. The remaining clearance sonar 278 secured to the rearmost portion 200R of the vehicle 200 is secured to a portion located at the right side of the widthwise center line Lx of the vehicle 200 and near a right end of the rearmost portion 200R of the vehicle 200 remote from the widthwise center line Lx.

One of the two clearance sonars 278 secured to the left side portion 200SL of the vehicle 200 is secured to a portion located at the front side of the longitudinally center line Ly of the vehicle 200 and relatively remote from the longitudinally center line Ly. The remaining clearance sonar 278 secured to the left side portion 200SL of the vehicle 200 is secured to a portion located at the rear side of the longitudinally center line Ly of the vehicle 200 and relatively remote from the longitudinally center line Ly.

One of the two clearance sonars 278 secured to the right side portion 200SR of the vehicle 200 is secured to a portion located at the front side of the longitudinally center line Ly of the vehicle 200 and relatively remote from the longitudinally center line Ly. The remaining clearance sonar 278 secured to the right side portion 200SR of the vehicle 200 is secured to a portion located at the rear side of the longitudinally center line Ly of the vehicle 200 and relatively remote from the longitudinally center line Ly.

The clearance sonars 278 are electrically connected to the vehicle ECU 290. Each clearance sonar 278 transmits supersonic wave and receives the supersonic wave reflected by the objects. Hereinafter, the supersonic wave reflected by the objects will be referred to as "the reflected supersonic wave". Each clearance sonar 278 sends to the vehicle ECU 290 a signal representing a length of time elapsing until the clearance sonar 278 receives the reflected supersonic wave since the clearance sonar 278 transmits the supersonic wave. The vehicle ECU 290 acquires a distance from the portion of the vehicle 200, to which each clearance sonar 278 is secured, to the object, based on the signal sent from the clearance sonar 278.

In this embodiment, the twelve clearance sonars 278 are secured to the vehicle 200 such that the clearance sonars 278 are oriented to transmit the supersonic waves so as to detect the object at any place around the vehicle 200 by the supersonic waves transmitted from the clearance sonars 278.

The vehicle wireless receiving/transmitting device 279 is electrically connected to the vehicle ECU 290. The vehicle wireless receiving/transmitting device 279 transmits various signals generated by the vehicle ECU 290 to the outside of the vehicle 200. In addition, the vehicle wireless receiving/transmitting device 279 receives various signals transmitted from the terminal ECU 190 via the terminal wireless receiving/transmitting device 130 to the outside of the operation terminal 100 and sends the received signals to the vehicle ECU 290.

<System Start-Up Switch>

A system start-up switch 280 is operated by the driver of the vehicle 200. The system start-up switch 280 is electrically connected to the vehicle ECU 290.

The vehicle ECU 290 starts to supply the electric power to the cameras 277 and gets ready to operate the engine 210 and drive the first and second motor generators 221 and 222 when the system start-up switch 280 is operated at an ON position by the driver. In other words, the vehicle ECU 290 activates or gets ready to activate vehicle movement devices such as the cameras 277, the engine 210, the first motor generator 221, and the second motor generator 222 necessary to drive the vehicle 200 when the system start-up switch 280 is operated at the ON position by the driver.

On the other hand, the vehicle ECU 290 stops supplying the electric power to the cameras 277, operating the engine 210, and driving the first and second motor generators 221 and 222 when the system start-up switch 280 is operated at an OFF position by the driver. In other words, the vehicle ECU 290 stops the activations of the cameras 277, the engine 210, the first motor generator 221, and the second motor generator 222, etc. necessary for driving the vehicle 200 when the system start-up switch 280 is operated at the OFF position by the driver.

<Summary of Operation of Embodiment Movement System>

Next, a summary of an operation of the embodiment movement system 10 will be described. The embodiment movement system 10 executes the remote movement control for causing the vehicle 200 to move remotely from a place at which the vehicle 200 has stopped to a predetermined place by a person, i.e., the user outside of the vehicle 200 using the operation terminal 100.

The remote movement control includes a remote parking control and a remote pulling-out control. The remote parking control is a control for causing the vehicle 200 to move remotely from the place at which the vehicle 200 has stopped to a parking space as the predetermined place where the user desires by the user using the operation terminal 100. The remote pulling-out control is a control for causing the vehicle 200 to move remotely from the parking space in which the vehicle 200 is parked to the predetermined place where the user desires by the user using the operation terminal 100.

The user of the operation terminal 100 outside of the vehicle 200 can cause the vehicle 200 to move remotely from the place where the vehicle 200 has stopped to the predetermined place by causing the embodiment movement system 10 to execute the remote parking control or the remote pulling-out control without operating the steering wheel 244, the acceleration pedal 281, the brake pedal 282, etc.

Below, the operation of the embodiment movement system 10 will be described, using an example that the user outside of the vehicle 200 causes the embodiment movement system 10 to execute the remote parking control or the pulling-out control by operating the operation terminal 100. In this regard, the user in the vehicle 200 may cause the embodiment movement system 10 to execute the remote parking lot control or the remote pulling-out control by operating the operation terminal 100.

In the following description, the term "touch interaction" is an action performed by the user of the operation terminal 100 with a finger of the user to touch the display 110 of the operation terminal 100.

Figure 5:
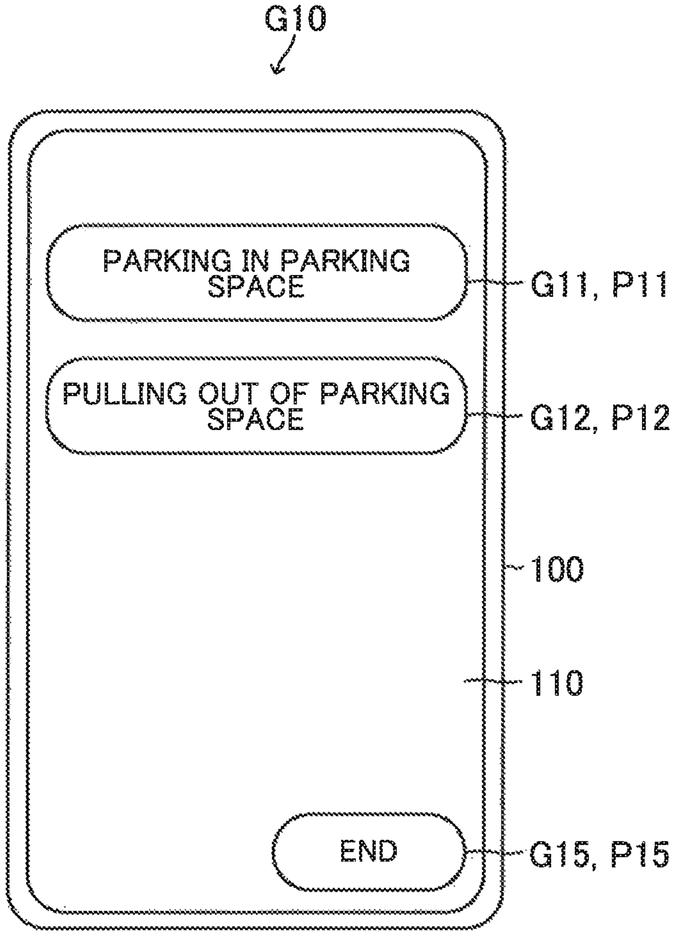
FIG. 5 is a view for showing the operation terminal which displays a parking/pulling-out selection image on a display.

The terminal ECU 190 starts up the remote movement application software and displays a parking/pulling-out selection image G10 as shown in FIG. 5 when the user performs the touch interaction for starting up the remote movement application software. The parking/pulling-out selection image G10 is an image for the user to select any one of (i) a parking process to automatically park the vehicle 200 in the parking space and (ii) a pulling-out process to automatically pull the vehicle 200 out of the parking space.

The parking/pulling-out selection image G10 includes a parking selection image G11, a pulling-out selection image G12, and an application software end image G15. The parking selection image G11 is an image indicating a term "PARKING IN PARKING SPACE" and a line circling the term "PARKING IN PARKING SPACE". The pulling-out selection image G12 is an image indicating a term "PULLING OUT OF PARKING SPACE" and a line circling the term "PULLING OUT OF PARKING SPACE". The application software end image G15 is an image indicating a term "END" and a line circling the term "END".

The parking selection image G11 is displayed at a generally center area of the display 110. The pulling-out selection image G12 is displayed at a portion immediately below the parking selection image G11 in the generally center area of the display 110. The application software end image G15 is displayed at a lower right corner area of the display 110.

The terminal ECU 190 transmits an application software start-up signal S10 to the outside of the operation terminal 100 when the user performs the touch interaction for starting up the remote movement application software. The application software start-up signal S10 includes a signal representing information such as an identification data for identifying the operation terminal 100.

The vehicle ECU 290 determines whether the operation terminal 100 represented by the application software start-up signal S10 is a registered operation terminal when the vehicle ECU 290 receives the application software start-up signal S10, The registered operation terminal is the operation terminal registered in the vehicle ECU 290 for causing the vehicle ECU 290 to execute the remote movement control.

The operation terminal 100 is the registered operation terminal. Thus, the vehicle ECU 290 determines that the operation terminal 100 is the registered operation terminal when the vehicle ECU 290 receives the application software start-up signal S10 transmitted from the terminal ECU 190. In this case the vehicle ECU 290 executes the remote movement control, based on various signals transmitted from the operation terminal 100.

The vehicle ECU 290 activates or gets ready to activate a vehicle movement devices such as the cameras 277, the engine 210, the first motor generator 221, and the second motor generator 222 when the vehicle ECU 290 determines that the operation terminal 100 is the registered operation terminal.

<Remote Parking Control>

The terminal ECU 190 transmits a parking selection signal S11 to the outside of the operation terminal 100 when the user performs the touch interaction to touch a parking selection image portion P11 with the user's finger. The parking selection image portion P11 is a portion of the display 110 corresponding to the parking selection image G11. The parking selection signal S11 is a signal representing that the user performs the touch interaction to touch the parking selection image portion P11 with the user's finger.

The vehicle ECU 290 transmits a parking space information signal S12 and a vehicle position information signal S13 to the outside of the vehicle 200 when the vehicle ECU 290 receives the parking selection signal S11 transmitted from the operation terminal 100. The parking space information signal S12 is a signal representing information on the parking spaces where the vehicle 200 can be parked in, based on the image data sent from the cameras 277. The vehicle position information signal S13 is a signal representing information on a position of the vehicle 200 relative to the parking spaces where the vehicle 200 can be parked in.

Figure 6:
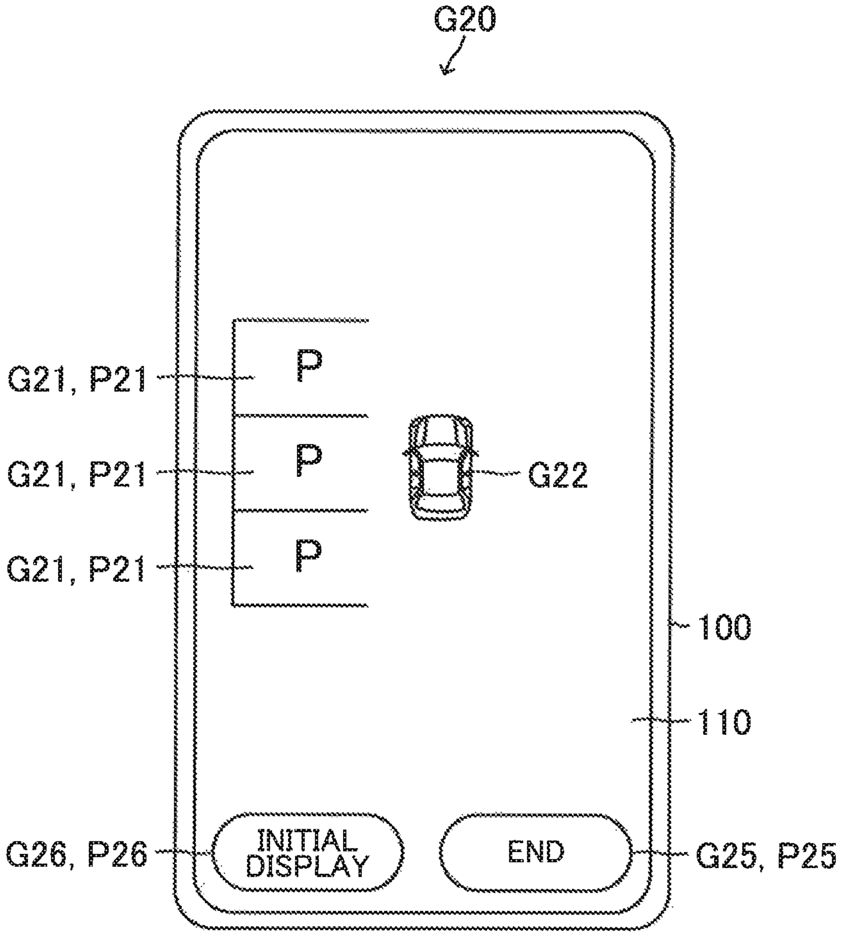
FIG. 6 is a view for showing the operation terminal which indicates a parking space selection image on the display.

As shown in FIG. 6, the terminal ECU 190 displays a parking space selection image G20 on the display 110 when the terminal ECU 190 receives the parking space information signal S12 and the vehicle position information signal S13 transmitted from the vehicle ECU 290. The parking space selection image G20 is an image for the user to select the parking space where the user desires to automatically park the vehicle 200.

The parking space selection image G20 includes candidate parking space images G21, a vehicle image G22, an application software end image G25, and an initial display image G26. Each candidate parking space image G21 is an image indicating a letter "P" and a line separating the parking spaces where the vehicle 200 can be parked in. The vehicle image G22 is an image indicating the vehicle 200. The application software end image G25 is the same image as the application software end image G15. The initial display image G26 is an image indicating a term "INITIAL DISPLAY" and a line circling the term "INITIAL DISPLAY".

Three candidate parking space images G21 are displayed at the generally center area of the display 110 such that the candidate parking space images G21 longitudinally align with each other. The vehicle image G22 is displayed at an area of the display 110 at the right side of the candidate parking space images G21. The application software end image G25 is displayed at the lower right corner area of the display 110. The initial display image G26 is displayed at a lower left corner area of the display 110.

The areas where the candidate parking space images G21 and the vehicle image G22 are displayed, are determined, based on the parking space information signal S12 and the vehicle position information signal S13 received by the vehicle ECU 290.

The terminal ECU 190 transmits a parking space signal S14 to the outside of the operation terminal 100 when the user performs the touch interaction to touch any one of parking space image portions P21 with the user's finger. The parking space image portions P21 are portions of the display 110 corresponding to the candidate parking space images G21, respectively. The parking space signal S14 is a signal representing the parking space image portion P21 which the user touches with the finger.

The vehicle ECU 290 starts an execution of the remote parking control and calculates a parking route when the vehicle ECU 290 receives the parking space signal S14 transmitted from the terminal ECU 190. The parking route is a route along which the vehicle 200 is planned to move to be parked in a target parking space Pin_tgt. The target parking space Pin_tgt is the parking space represented by the parking space signal S14 or targeted to park the vehicle 200.

The vehicle ECU 290 transmits a parking remaining distance signal S15 to the outside of the vehicle 200 when the vehicle ECU 290 finishes a calculation of the parking route. The parking remaining distance signal S15 is a signal representing a distance between the target parking space Pin_tgt and the present position of the vehicle 200.

The vehicle ECU 290 acquires the distance between the target parking space Pin_tgt and the present position of the vehicle 200 by a calculation using the image data sent from the cameras 277.

Figure 7:
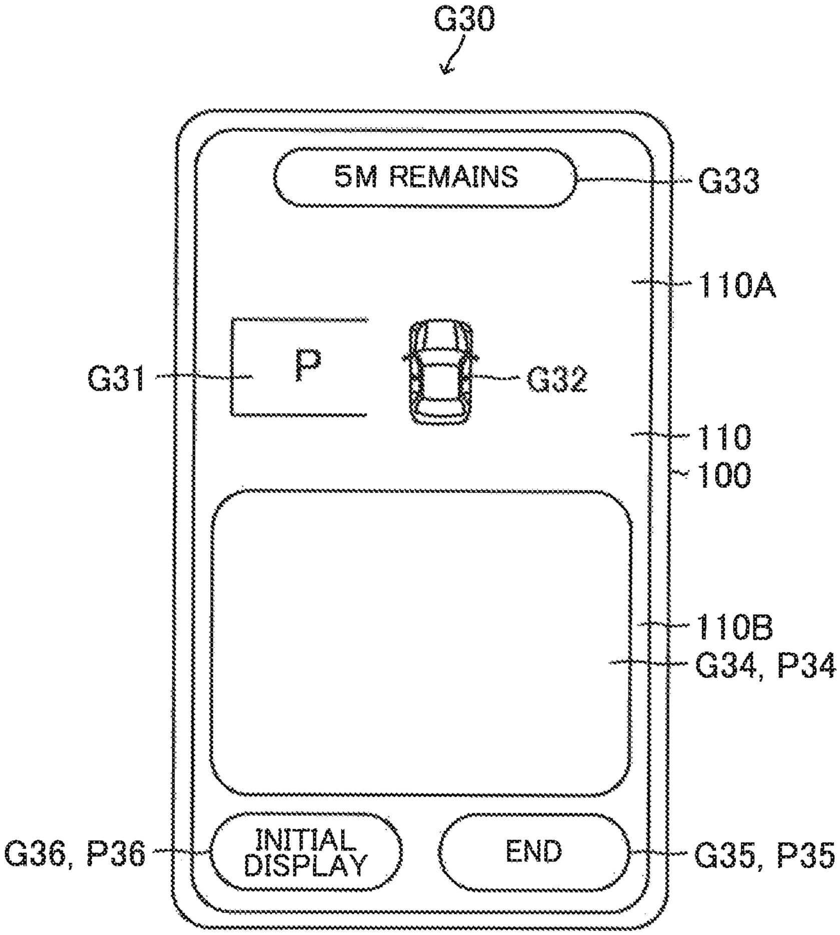
FIG. 7 is a view for showing the operation terminal which indicates a parking touch interaction image on the display.

As shown in FIG. 7, the terminal ECU 190 displays a parking touch interaction image G30 on the display 110 when the user performs the touch interaction to touch any one of the parking space image portions P21 with the finger. The parking touch interaction image G30 is an image for the user to perform the touch interaction for automatically parking the vehicle 200 in the target parking space Pin_tgt. The target parking space Pin_tgt is the parking space corresponding to the parking space image portion P21 selected by the user's touch interaction.

The parking touch interaction image G30 includes a target parking space image G31, a vehicle image G32, a parking remaining distance image G33, a touch interaction area image G34, an application software end image G35, and an initial display image G36.

The target parking space image G31 is an image indicating the target parking space Pin_tgt. The vehicle image G32 is the same image as the vehicle image G22. The parking remaining distance image G33 is an image indicating (i) characters indicating the distance between the present position of the vehicle 200 and the target parking space Pin_tgt and (ii) a line circling the characters. The touch interaction area image G34 is an image defining an area of the display 110 having a predetermined area. The application software end image G35 is the same image as the application software end image G25. The initial display image G36 is the same image as the initial display image G26.

The target parking space image G31 is displayed at a generally center area of an upper half area 110A of the display 110. The vehicle image G32 is displayed at an area of the display 110 next to the target parking space image G31 at the right side of the target parking space image G31. The parking remaining distance image G33 is displayed at an uppermost area of the upper half area 110A of the display 110. Therefore, in this embodiment, the upper half area 110A of the display 110 is used as information display area for displaying the images to provide the user with information on the vehicle 200 parked in the target parking space Pin_tgt.

The terminal ECU 190 receives the parking remaining distance signal S15 transmitted from the vehicle ECU 290 and acquires the distance represented by the parking remaining distance signal S15. The terminal ECU 190 displays the acquired distance by the parking remaining distance image G33.

The touch interaction area image G34 is displayed at a lower half area 110B of the display 110. In this embodiment, an area of the touch interaction area image G34 occupies substantial part of the lower half area 110B of the display 110.

In this regard, an area that the user can easily move the finger touching a touch interaction portion P34 may be optionally determined as the area of the touch interaction area image G34. The touch interaction portion P34 is a portion of the display 110 corresponding to the touch interaction area image G34.

The application software end image G35 is displayed at the lower right corner area of the display 110. The initial display image G36 is displayed at the lower left corner area of the display 110.

Figure 8:
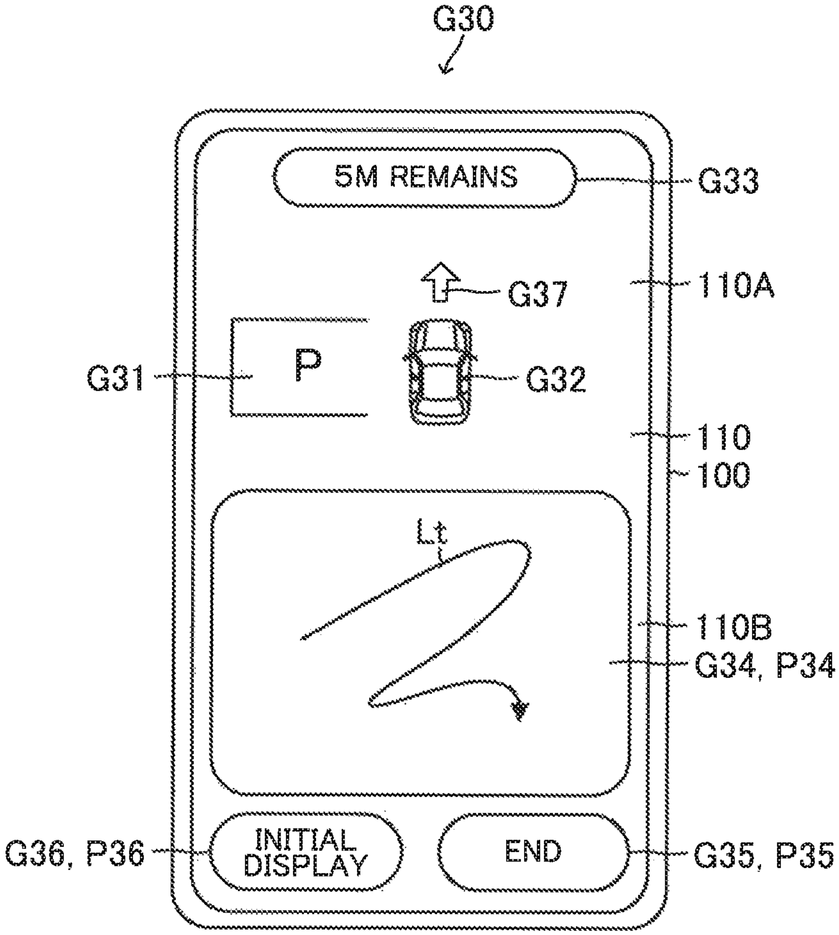
FIG. 8 is a view for showing the operation terminal which indicates the parking touch interaction image on the display.

The terminal ECU 190 transmits a control execution command signal S16 to the outside of the operation terminal 100 while the user moves the finger, touching the touch interaction portion P34 to satisfy a predetermined touch interaction condition Cin as shown by a line Lt in FIG. 8. The control execution command signal S16 is a single representing that the touch interaction satisfying the predetermined touch interaction condition Cin is performed. Hereinafter, the predetermined touch interaction condition Cin will be referred to as "the parking touch interaction condition Cin".

In this embodiment, the parking touch interaction condition Cin is a condition C1in that the number of sharp curves or sharp bends in a path of the movement of the user's finger touching the touch interaction portion P34 for a predetermined length of time T1in is greater than or equal to a predetermined number Min.

In this embodiment, the terminal ECU 190 determines that one sharp curve or one sharp bend arises when a vector of the movement of the user's finger on the touch interaction portion P34 changes by a predetermined angle Ath or more. For example, an angle of change of the vector of the movement of the user's finger on the touch interaction portion P34 is generally 180 degrees when the user moves the finger on the touch interaction portion P34 in a certain direction and then, moves the finger on the touch interaction portion P34 in a direction opposite to the certain direction. In other word, the angle of the change of the vector of the movement of the user's finger on the touch interaction portion P34 is generally 180 degrees when the user reverses a direction of the movement of the finger. Therefore, the terminal ECU 190 determines that the vector of the movement of the user's finger changes by an angle greater than or equal to the predetermined angle Ath, and one sharp curve or one sharp bend arises when (i) the predetermined angle Ath is set, for example, to 150 degrees, and (ii) the user reverses the direction of the movement of the finger.

Figure 9A:
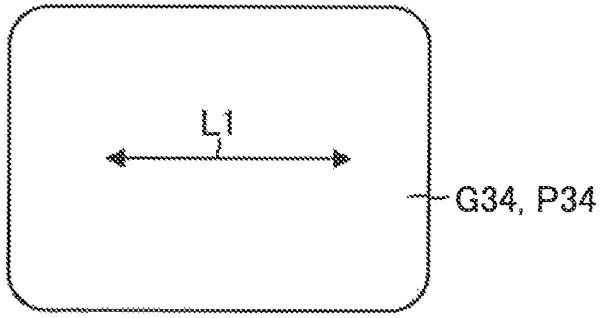
FIG. 9A is a view for showing an example of a path of movement of a finger of a user on the parking touch interaction portion.
Figure 9B:
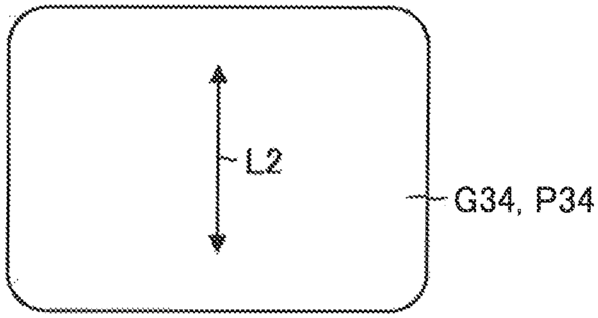
FIG. 9B is a view for showing another example of the path of the movement of the finger of the user on the parking touch interaction portion.
Figure 9C:
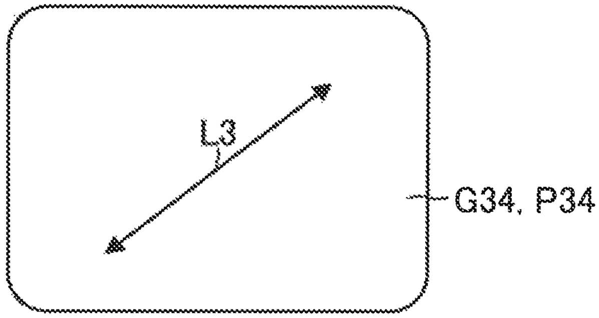
FIG. 9C is a view for showing further another example of the path of the movement of the finger of the user on the parking touch interaction portion.
Figure 9D:
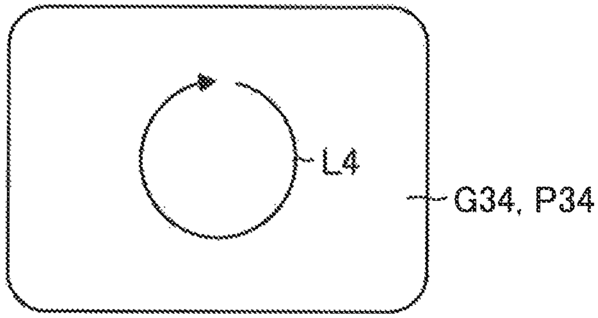
FIG. 9D is a view for showing further another example of the path of the movement of the finger of the user on the parking touch interaction portion.

As described above, the parking touch interaction condition Cin does not include a condition that the user's finger moves, touching the touch interaction portion P34 along a predetermined specific path. The predetermined specific path is, for example, any of (i) a straight path L1 extending transversely as shown in FIG. 9A, (ii) a straight path L2 extending longitudinally as shown in FIG. 9B, (iii) a straight path L3 extending obliquely as shown in FIG. 9C, and (iv) a circular path L4 as shown in FIG. 9D.

Therefore, in this embodiment, the parking touch interaction condition Cin is satisfied when the user's finger moves, touching the touch interaction portion P34 along a random path including any of (i) the straight path extending longitudinally, (ii) the straight path extending transversely, (iii) the straight path extending obliquely, and (iv) a curved path.

The predetermined length of time T1in and the predetermined number N1in are set to a length of time and a number, respectively suitable for determining whether the user has intension of causing the vehicle ECU 290 to execute the remote parking control. For example, the predetermined number N1in is set to one. In this case, the predetermined length of time T1in is set to the length of time predicted to be taken for the user to move the finger, touching the touch interaction portion P34 with at least one sharp curve or at least one sharp bend when the user has the intension of causing the vehicle ECU 290 to execute the remote parking control.

Further, the parking touch interaction condition Cin may be a condition C2in that a distance Dtouch of the movement of the user's finger touching the touch interaction portion P34 for a predetermined length of time T2in is greater than or equal to a predetermined distance D2in. The predetermined length of time T2in and the predetermined distance D2in are set to a length of time and a distance, respectively suitable for determining whether the user has the intention of causing the vehicle ECU 290 to execute the remote parking control. For example, the predetermined distance D2in is set to a distance suitable for determining whether the user has the intention of causing the vehicle ECU 290 to execute the remote parking control. In this case, the predetermined length of time T2in is set to the length of time predicted to be taken for the user to move the finger, touching the touch interaction portion P34 by the predetermined distance D2in when the user has the intension of causing the vehicle ECU 290 to execute the remote parking control.

Further, the parking touch interaction condition Cin may be a condition C3in that a finger movement speed continuation length of time T is longer than or equal to a predetermined length of time T3in. The finger movement speed continuation length of time T is a length of time that a movement speed Vtouch of the user's finger touching the touch interaction portion P34 is continuously maintained at a speed higher than or equal to a predetermined speed V3in. The predetermined length of time T3in and the predetermined speed V3in may be optionally set to a length of time and a speed, respectively suitable for determining whether the user have intension of causing the vehicle ECU 290 to execute the remote parking control. For example, the predetermined length of time T3in is set to a length of time suitable for determining whether the user has the intension of causing the vehicle ECU 290 to execute the remote parking control. In this case, the predetermined speed V3in is set to a predicted speed of the movement of the user's finger touching the touch interaction portion P34 when the user has the intension of causing the vehicle ECU 290 to execute the remote parking control.

The parking touch interaction condition Cin may include two or more of the conditions C1in, C2in, and C3in.

After the vehicle ECU 290 finishes the calculation of the parking route, the vehicle ECU 290 controls the activations of the fuel injector actuators 212, the friction brake actuators 232, and the motor driver 242 so as to cause the vehicle 200 to move to the target parking space Pin_tgt along the parking route while the vehicle ECU 290 receives the control execution command signal S16.

The vehicle ECU 290 continues to transmit the vehicle position information signal S13, the parking remaining distance signal S15, and a movement direction signal S17 to the outside of the vehicle 200 while the vehicle ECU 290 executes the remote parking control. The movement direction signal S17 represents a direction of movement of the vehicle 200.

Figure 10:
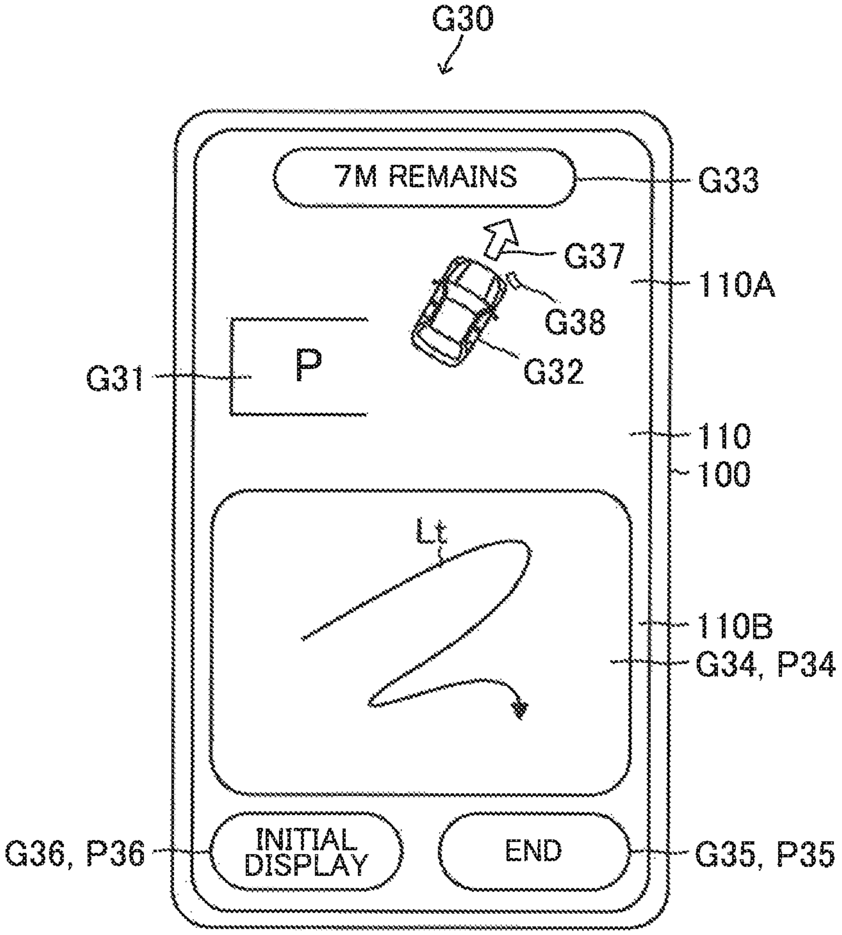
FIG. 10 is a view for showing the operation terminal which indicates the parking touch interaction image on the display.

As shown in FIG. 10, the terminal ECU 190 changes a position of the vehicle image G32 so as to correspond the position of the vehicle image G32 displayed on the display 110 to the position of the vehicle 200 relative to the target parking space Pin_tgt represented by the vehicle position information signal S13 when the terminal ECU 190 receives the vehicle position information signal S13 transmitted from the vehicle ECU 290.

In addition, the terminal ECU 190 displays the parking remaining distance image G33 on the display 110 to indicate the distance represented by the parking remaining distance signal S15 when the terminal ECU 190 receives the parking remaining distance signal S15 transmitted from the vehicle ECU 290.

In addition, the terminal ECU 190 displays a movement direction image G37 on a portion of the display 110 near the vehicle image G32 when the terminal ECU 190 receives the movement direction signal S17 transmitted from the vehicle ECU 290. The movement direction image G37 is an image indicating the direction of the movement of the vehicle 200 represented by the movement direction signal S17.

The vehicle ECU 290 transmits one or more sonar signals S18 to the outside of the vehicle 200 when the vehicle ECU 290 recognizes one or more objects existing within a predetermined distance Dth, based on one or more signals sent from one or more clearance sonars 278 while the vehicle ECU 290 executes the remote parking control. The sonar signal S18 is a signal representing the clearance sonar 278 which sends the signal representing the object(s) existing within the predetermined distance Dth to the vehicle ECU 290.

As shown in FIG. 10, the terminal ECU 190 displays one or more sonar images G38 on a portion of the operation terminal 100 near the vehicle image G32 when the terminal ECU 190 receives one or more sonar signals S18. The sonar image G38 is an image indicating the clearance sonar 278 represented by the sonar signal S18 relative to the vehicle image G32.

The operation terminal 100 is configured to display the sonar images G38 by color such as red capable of surely noticing the user that the objects exist within the predetermined distance Dth from the vehicle 200. In particular, the operation terminal 100 is configured to display the sonar images G38 by the color different from the color of the images other than the sonar images G38.

The operation terminal 100 may be configured to blink the sonar images G38. Alternatively, the operation terminal 100 may be configured to generate alert sound in addition to displaying the sonar images G38. Alternatively, the operation terminal 100 may be configured to generate the alert sound when (I) one or more sonar images G38 are displayed, and (ii) the distance between the vehicle 200 and the object becomes equal to or shorter than a predetermined distance Dshort. The predetermined distance Dshort is shorter than the predetermined distance Dth.

The terminal ECU 190 stops transmitting the control execution command signal S16 to the outside of the operation terminal 100 when the parking touch interaction condition Cin becomes unsatisfied, for example, in response to the user taking the finger off the touch interaction portion P34.

The vehicle ECU 290 stops the vehicle 200 by the friction brake mechanisms 231 when the vehicle ECU 290 does not receive the control execution command signal S16.

The vehicle ECU 290 ends the execution of the remote parking control by (i) locking the wheels of the vehicle 200 by the parking brake 233, (ii) locking the doors of the vehicle 200 by the door lock mechanism 250, and (iii) stopping activating the vehicle movement devices such as the cameras 277, the engine 210, the first motor generator 221, and the second motor generator 222 necessary to drive the vehicle 200 when the vehicle 200 arrives at the target parking space Pin_tgt and thus, the parking process to automatically park the vehicle 200 in the target parking space Pin_tgt is completed.

In addition, the vehicle ECU 290 transmits a parking completed signal S19 to the outside of the vehicle 200 when the parking process to automatically park the vehicle 200 in the target parking space Pin_tgt is completed. The parking completed signal S19 represents that the parking process to automatically park the vehicle 200 in the target parking space Pin_tgt is completed.

Figure 11:
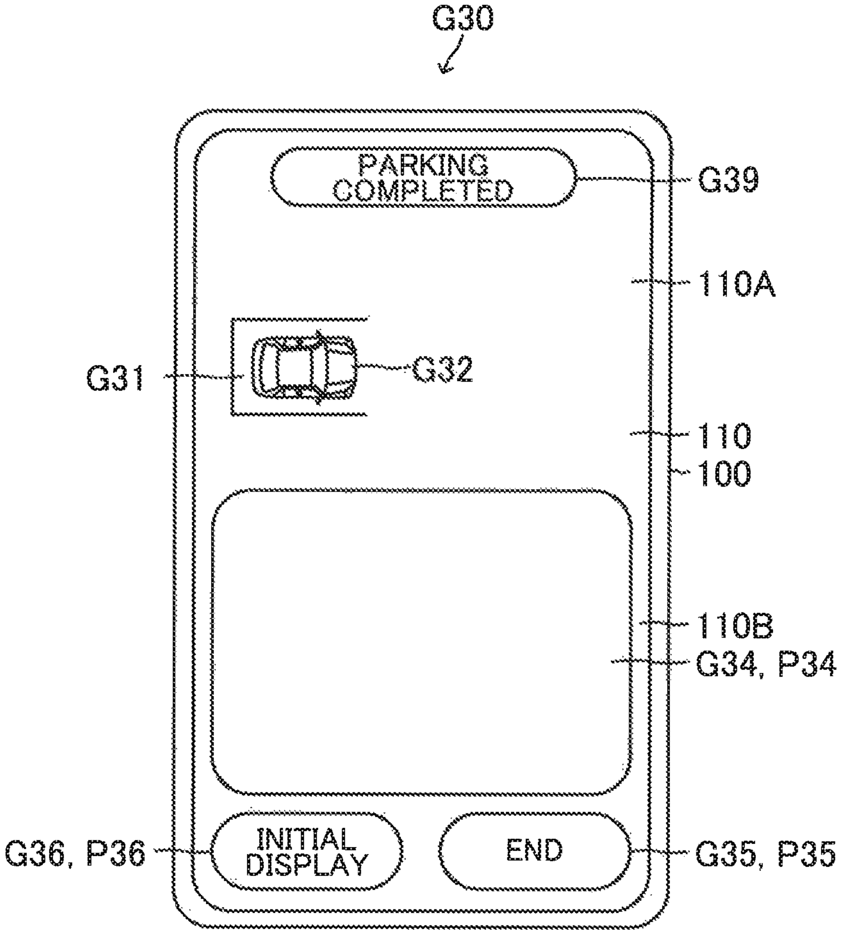
FIG. 11 is a view for showing the operation terminal which indicates the parking touch interaction image on the display.

As shown in FIG. 11, the terminal ECU 190 displays a parking completed image G39 on the display 110 when the terminal ECU 190 receives the parking completed signal S19 transmitted from the vehicle ECU 290. The parking completed image G39 is an image indicating that the parking process to automatically park the vehicle 200 in the target parking space Pin_tgt is completed. The parking completed image G39 is displayed at the uppermost area of the display 110.

In the embodiment movement system 10, the parking touch interaction condition Cin is the condition C1in that the number of the sharp curves or the sharp bends in the path of the movement of the user's finger touching the touch interaction portion P34 for the predetermined length of time T1in is greater than or equal to the predetermined number N1in.

Therefore, a possibility that the movement of the user's finger touching the touch interaction portion P34 satisfies the parking touch interaction condition Cin is extremely small when the user mistakenly touches the touch interaction portion P34 with the finger. Thus, a possibility that the remote parking control is executed is extremely small when the user mistakenly touches the touch interaction portion P34 with the finger Therefore, with the embodiment movement system 10, it can be ensured that the remote parking control is executed only when the user has the intention of automatically parking the vehicle 200 in the target parking space Pin_tgt.

Further, a possibility that the terminal ECU 190 recognizes that the movement of the user's finger satisfies the parking touch interaction condition Cin is extremely small when the user does not touch the touch interaction portion P34 with the finger, but the terminal ECU 190 recognizes that the user touches the touch interaction portion P34 with the finger due to problems in a contact sensing function of the display 110. Thus, the possibility that the remote parking control is executed is extremely small when the user does not touch the touch interaction portion P34 with the finger, but the terminal ECU 190 realizes that the user touches the touch interaction portion P34 with the finger. Therefore, with the embodiment movement system 10, it can be ensured that the remote parking control is executed only when the user has the intention of automatically parking the vehicle 200 in the target parking space Pin_tgt.

Further, as described above, the parking touch interaction condition Cin does not include the condition that the user's finger moves, touching the touch interaction portion P34 along the predetermined specific path (see FIGS. 9A, 9B, 9C, and 9D). Therefore, the user can automatically park the vehicle 200 in the target parking space Pin_tgt by moving the finger on the touch interaction portion P34 in a random manner. In other words, the user's finger is not limited to moving, touching the touch interaction portion P34 along any specific paths for automatically parking the vehicle 200 in the target parking space Pin_tgt. Thus, the user can cause the vehicle ECU 290 to execute the remote parking control by the unlimited touch interaction. In addition, the user can easily perform the touch interaction satisfying the parking touch interaction condition Cin when the user has to perform the touch interaction to touch the touch interaction portion P34 with the finger of a user's hand carrying the operation terminal 100.

Further, the user's finger is not limited to moving, touching the touch interaction portion P34 along any specific paths for automatically parking the vehicle 200 in the target parking space Pin_tgt. Therefore, the user can perform the touch interaction satisfying the parking touch interaction condition Cin without looking at the display 110. Thus, the user can easily confirm situations relating to the movement of the vehicle 200 and the surroundings of the vehicle 200 with user's eyes directly.

<Remote Pull-Out Control>

On the other hand, the terminal ECU 190 transmits a pulling-out selection signal S20 to the outside of the operation terminal 100 when the user performs the touch interaction to touch a pulling-out selection image portion P12 with the user's finger. The pulling-out selection image portion P12 is a portion of the display 110 corresponding to the pulling-out selection image G12. The pulling-out selection signal S20 is a signal representing that the user performs the touch interaction to touch the pulling-out selection image portion P12 with the user's finger.

The vehicle ECU 290 transmits a vehicle position information signal S21 to the outside of the vehicle 200 when the vehicle ECU 290 receives the pulling-out selection signal S20 transmitted from the operation terminal 100. The vehicle position information signal S21 is a signal representing information on the position of the vehicle 200 relative to the parking space where the vehicle 200 has been parked, based on the image data sent from the cameras 277.

Figure 12:
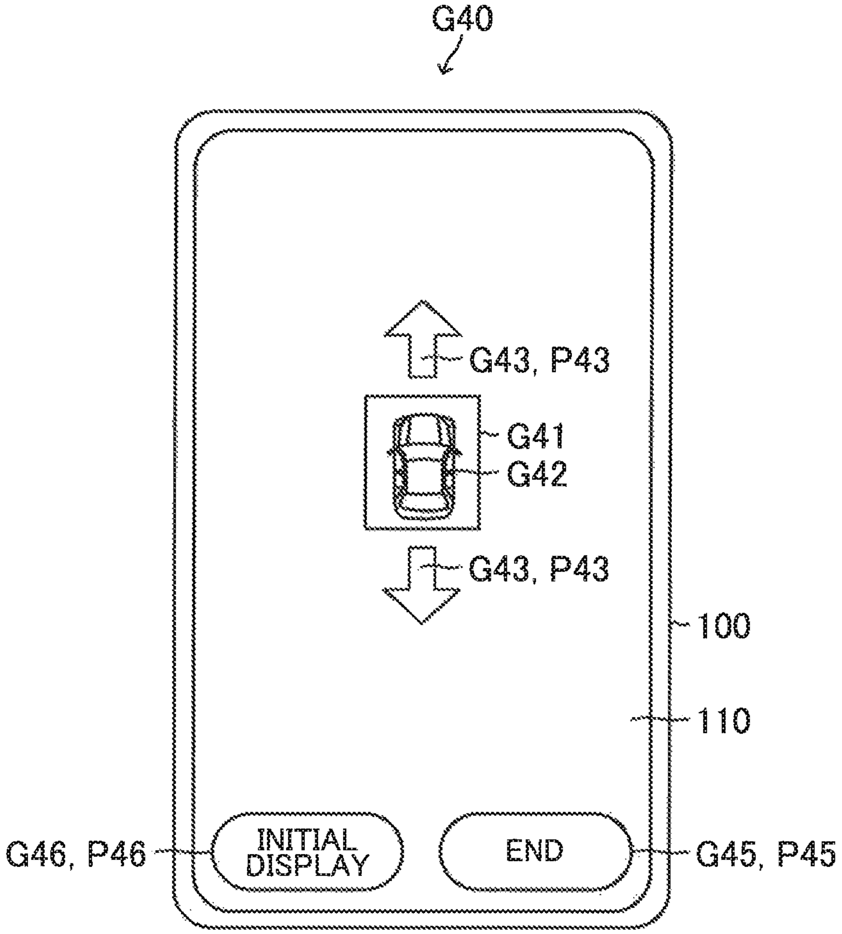
FIG. 12 is a view for showing the operation terminal which indicates a pulling-out direction selection image on the display.

As shown in FIG. 12, the terminal ECU 190 displays a pulling-out direction selection image G40 on the display 110 when the terminal ECU 190 receives the vehicle position information signal S21 transmitted from the vehicle ECU 290. The pulling-out direction selection image G40 is an image for the user to select a direction, in which the user desires to automatically pull the vehicle 200 out of the parking space where the vehicle 200 is parked now. Hereinafter, the parking space where the vehicle 200 is parked now will be referred to as "the present parking space Pnow".

The pulling-out direction selection image G40 includes a present parking space image G41, a vehicle image G42, candidate pulling-out direction images G43, an application software end image G45, and an initial display image G46. The present parking space image G41 is an image indicating the present parking space Pnow. The vehicle image G42 is an image indicating the vehicle 200. Each candidate pulling-out direction image G43 is an image indicating a direction that the user can select as a direction in which the vehicle 200 is automatically pulled out of the present parking space Pnow. The application software end image G45 is the same image as the application software end image G25. The initial display image G46 is the same image as the initial display image G26.

The present parking space image G41 and the vehicle image G42 are displayed at the generally center area of the display 110. The candidate pulling-out direction image G43 corresponding to the direction of the movement of the vehicle 200 moving forward is displayed near and at an upper side of the present parking space image G41. On the other hand, the candidate pulling-out direction image G43 corresponding to the direction of the movement of the vehicle 200 moving rearward is displayed at an area of the display 110 near and at a lower side of the present parking space image G41.

The application software end image G45 is displayed at the lower right corner are of the display 110. The initial display image G46 is displayed at the lower left corner area of the display 110.

The terminal ECU 190 transmits a pulling-out direction signal S22 when the user performs the touch interaction to touch any of candidate pulling-out direction image portions P43 with the user's finger. The candidate pulling-out direction image portions P43 are portions of the display 110 corresponding to the candidate pulling-out direction images G43, respectively. The pulling-out direction signal S22 is a signal representing the candidate pulling-out direction image portion P43 which the user touches with the finger.

The vehicle ECU 290 starts an execution of the remote pulling-out control and calculates a pulling-out route when the vehicle ECU 290 receives the pulling-out direction signal S22 transmitted from the terminal ECU 190. The pulling-out route is a route along which the vehicle 200 is planned to move in the pulling-out direction represented by the pulling-out direction signal S22 to pull out the vehicle 200 to a predetermined place Pout_tgt. The predetermined place Pout_tgt is a place targeted to move and stop the vehicle 200 by the remote pulling-out control. Hereinafter, the predetermined place Pout_tgt will be referred to as "the target pulling-out place Pout_tgt".

The vehicle ECU 290 transmits a pulling-out remaining distance signal S23 to the outside of the vehicle 200 when the vehicle ECU 290 finishes a calculation of the pulling-out route. The pulling-out remaining distance signal S23 is a signal representing a distance between the target pulling-out place Pout_tgt and the present position of the vehicle 200.

The vehicle ECU 290 acquires the distance between the target pulling-out place Pout_tgt and the present position of the vehicle 200 by the calculation using the image data sent from the cameras 277.

Figure 13:
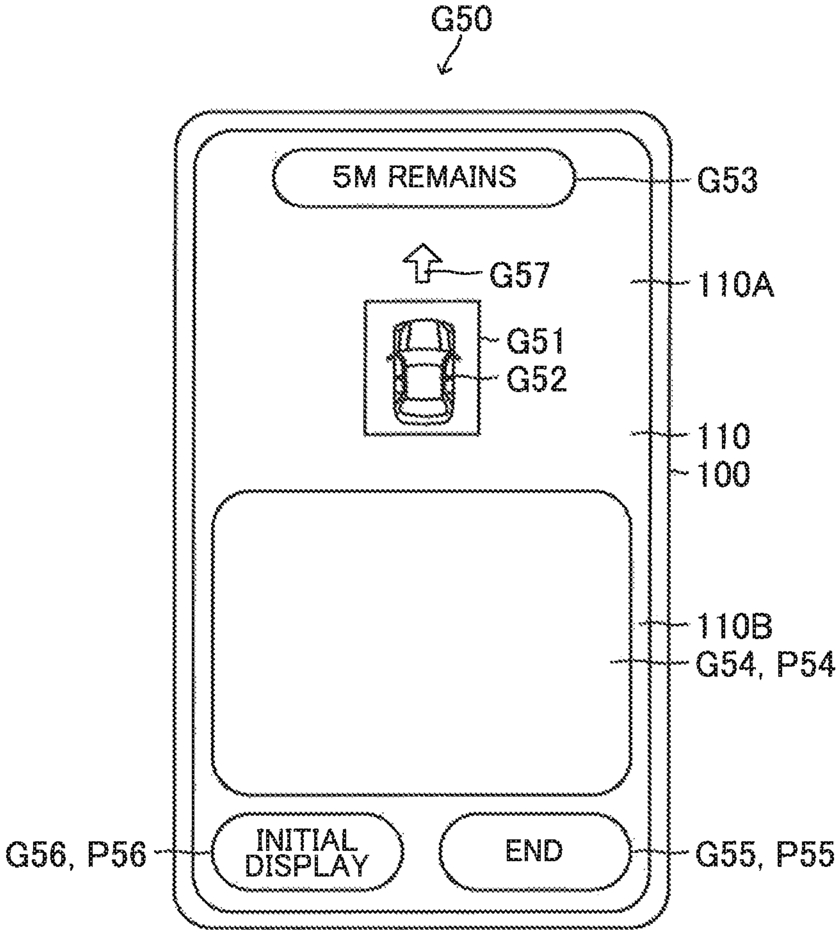
FIG. 13 is a view for showing the operation terminal which indicates the pulling-out touch interaction image on the display.

As shown in FIG. 13, the terminal ECU 190 displays a pulling-out touch interaction image G50 on the display 110 when the user performs the touch interaction to touch any of the candidate pulling-out direction image portions P43 with the user's finger. The pulling-out touch interaction image G50 is an image for the user to perform the touch interaction for automatically pulling the vehicle 200 out of the present parking space Pnow in the pulling-out direction selected by the user's touch interaction. FIG. 13 shows an example that the pulling-out direction selected by the user is a direction that the vehicle 200 is caused to move forward.

The pulling-out touch interaction image G50 includes a present parking space image G51, a vehicle image G52, a pulling-out direction image G57, a pulling-out remaining distance image G53, a touch interaction area image G54, an application software end image G55, and an initial display image G56.

The present parking space image G51 is the same image as the present parking space image G41. The vehicle image G52 is the same image as the vehicle image G42. The pulling-out direction image G57 is an image indicating the pulling-out direction selected by the use's touch interaction. The pulling-out remaining distance image G53 is an image indicating the distance between the present position of the vehicle 200 and the target pulling-out place Pout_tgt. The touch interaction area image G54 is the same image as the touch interaction area image G34. The application software end image G55 is the same image as the application software end image G45. The initial display image G56 is the same image as the initial display image G46.

The present parking space image G51 and the vehicle image G52 are displayed at a generally center area of the upper half area 110A of the display 110. The pulling-out direction image G57 is displayed at the upper half area 110A of the display 110 at the immediately upper side of the present parking space image G51. The pulling-out remaining distance image G53 is displayed at the uppermost area of the upper half area 110A of the display 110. Therefore, in this embodiment, the upper half area 110A of the display 110 is used the information display area for displaying the images to provide the user with information on the vehicle 200 pulled out to the target pulling-out place Pout_tgt.

The terminal ECU 190 receives the pulling-out remaining distance signal S23 transmitted from the vehicle ECU 290 and acquires the distance represented by the pulling-out remaining distance signal S23. The terminal ECU 190 displays the acquired distance by the pulling-out remaining distance image G53.

The touch interaction area image G54 is displayed at the lower half area 110B of the display 110. In this embodiment, an area of the touch interaction area image G54 displayed in automatically pulling the vehicle 200 out of the present parking space Pnow by the remote pulling-out control is the same area as the area of the touch interaction area image G34 displayed in automatically parking the vehicle 200 in the target parking space Pin_tgt by the remote parking control.

In this regard, the area of the touch interaction area image G54 displayed in automatically pulling the vehicle 200 out of the present parking space Pnow by the remote pulling-out control may be different from the area of the touch interaction area image G34 displayed in automatically parking the vehicle 200 in the target parking space Pin_tgt by the remote parking control.

The application software end image G55 is displayed at the lower right corner area of the display 110. The application software end image G55 is displayed at the lower left corner area of the display 110.

Figure 14:
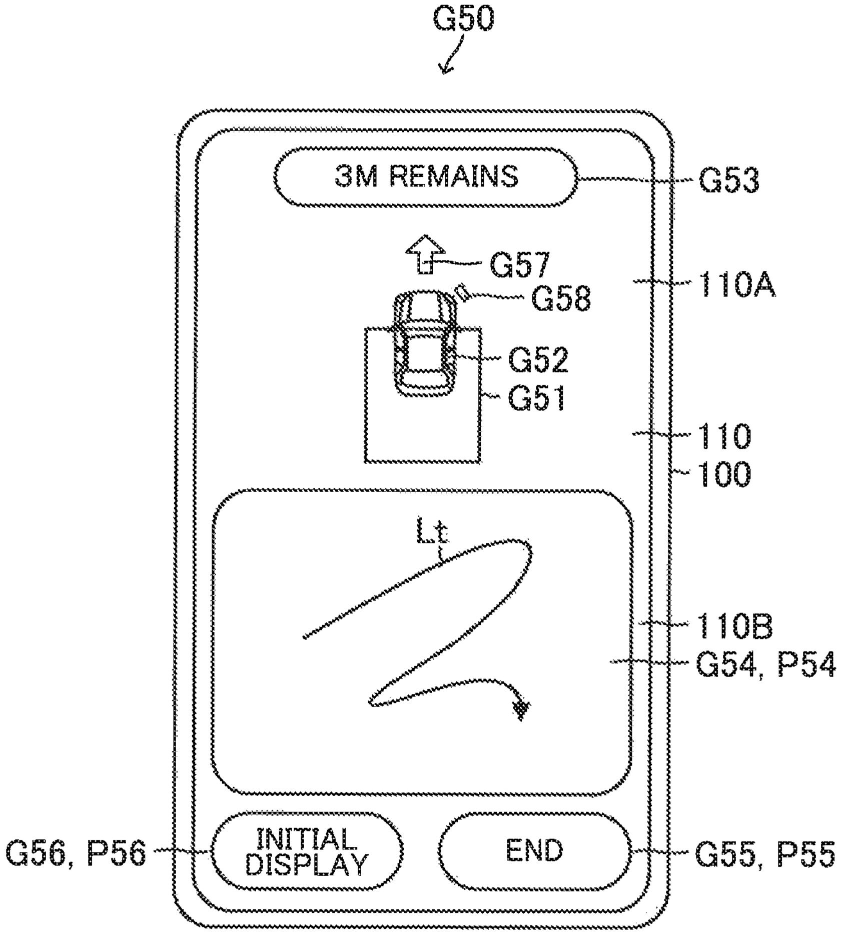
FIG. 14 is a view for showing the operation terminal which indicates the pulling-out touch interaction image on the display.

The terminal ECU 190 transmits the control execution command signal S16 to the outside of the operation terminal 100 while the user moves the finger, touching a touch interaction portion P54 to satisfy a predetermined touch interaction condition Cout as shown by the line Lt in FIG. 14. The touch interaction portion P54 is a portion of the display 110 corresponding to the touch interaction area image G54. In this case, the control execution command signal S16 represents that the touch interaction satisfying the predetermined touch interaction condition Cout is performed. Hereinafter, the predetermined touch interaction condition Cout will be referred to as "the pulling-out touch interaction condition Cout".

In this embodiment, the pulling-out touch interaction condition Cout is a condition that the number of the sharp curves or the sharp bends in the path of the movement of the user's finger touching the touch interaction portion P54 for a predetermined length of time T1out is greater than or equal to a predetermined number N1out.

In this embodiment, the terminal ECU 190 determines that one sharp curve or one sharp bend occurs when the vector of the movement of the user's finger on the touch interaction portion P54 changes by the predetermined angle Ath or more. For example, the angle of the change of the vector of the movement of the user's finger on the touch interaction portion P54 is generally 180 degrees when the user moves the finger on the touch interaction portion P54 in a certain direction and then, moves the finger on the touch interaction portion P54 in a direction opposite to the certain direction. In other word, the angle of the change of the vector of the movement of the user's finger on the touch interaction portion P54 is generally 180 degrees when the user reverses a direction of the movement of the finger. Therefore, the terminal ECU 190 determines that the vector of the movement of the user's finger changes by an angle greater than or equal to the predetermined angle Ath, and one sharp curve or one sharp bend occurs when the predetermined angle Ath is set, for example to 150 degrees, and the user reverses the direction of the movement of the finger.

As described above, the pulling-out touch interaction condition Cout does not include a condition that the user's finger moves, touching the touch interaction portion P54 along a predetermined specific path. The predetermined specific path is, for example, any of (i) the straight path L1 shown in FIG. 9A, (ii) the straight path L2 shown in FIG. 9B, (iii) the straight path L3 shown in FIG. 9C, and (iv) the circular path L4 shown in FIG. 9D. Therefore, in this embodiment, the pulling-out touch interaction condition Cout is satisfied when the user's finger moves, touching the touch interaction portion P54 along the random path including any of (I) the straight path extending longitudinally, (ii) the straight path extending transversely, (iii) the straight path extending obliquely, and (iv) the curved path.

The predetermined length of time T1out and the predetermined number N1out are set to a length of time and a number, respectively suitable for determining whether the user has intension of causing the vehicle ECU 290 to the remote pulling-out control. For example, the predetermined number N1out is set to one. In this case, the predetermined length of time flout is set to the length of time predicted to be taken for the user to move the finger, touching the touch interaction portion P54 with at least one sharp curve or at least one sharp bend when the user has the intension of causing the vehicle ECU 290 to execute the remote pulling-out control.

The predetermined length of time T1out and the predetermined number N1out may be the same as or different from the predetermined length of time T1in and the predetermined number N1in of the condition C1, respectively.

Further, the pulling-out touch interaction condition Cout may be a condition C2out that the distance Dtouch of the movement of the user's finger touching the touch interaction portion P54 for a predetermined length of time T2out is greater than or equal to a predetermined distance D2out. The predetermined length of time T2out and the predetermined distance D2out are set to a length of time and a distance, respectively suitable for determining whether the user has the intention of causing the vehicle ECU 290 to execute the remote pulling-out control. For example, the predetermined distance D2out is set to a distance suitable for determining whether the user has the intention of causing the vehicle ECU 290 to execute the remote pulling-out control. In this case, the predetermined length of time T2out is set to a length of time predicted to be taken for the user to move the finger, touching the touch interaction portion P54 by the predetermined distance D2out when the user has the intension of causing the vehicle ECU 290 to execute the remote pulling-out control.

The predetermined length of time T2out and the predetermined distance D2out may be the same as or different from the predetermined length of time T2in and the predetermined distance D2in of the condition C2in, respectively.

Further, the pulling-out touch interaction condition Cout may be a condition C3out that the finger movement speed continuation length of time T is longer than or equal to a predetermined length of time T3out. The finger movement speed continuation length of time T is a length of time that the movement speed Vtouch of the user's finger touching the touch interaction portion P54 is continuously maintained at a speed higher than or equal to a predetermined speed V3out. The predetermined length of time T3out and the predetermined speed V3in may be set to a length of time and a speed, respectively suitable for determining whether the user have intension of causing the vehicle ECU 290 to execute the remote pulling-out control. For example, the predetermined length of time T3out is set to a length of time suitable for determining whether the user has the intension of causing the vehicle ECU 290 to execute the remote pulling-out control. In this case, the predetermined speed V3out is set to a predicted speed of the movement of the user's finger touching the touch interaction portion P54 when the user has the intension of causing the vehicle ECU 290 to execute the remote pulling-out control.

The predetermined length of time T3out and the predetermined speed V3out may be the same as or different from the predetermined length of time T3in and the predetermined speed V3in of the condition C3in, respectively.

The pulling-out touch interaction condition Cout may include two or more of the conditions Clout, Clout, and C3out.

After the vehicle ECU 290 finishes the calculation of the pulling-out route, the vehicle ECU 290 controls the activations of the fuel injector actuators 212, the friction brake actuators 232, and the motor driver 242 so as to cause the vehicle 200 to move to the target pulling-out place Pout_tgt along the pulling-out route while the vehicle ECU 290 receives the control execution command signal S16.

The vehicle ECU 290 continues to transmit the vehicle position information signal S21 and the pulling-out remaining distance signal S23 to the outside of the vehicle 200 while the vehicle ECU 290 executes the remote pulling-out control.

As shown in FIG. 14, the terminal ECU 190 changes a position of the vehicle image G52 so as to correspond the position of the vehicle image G52 displayed on the display 110 to the position of the vehicle 200 relative to the present parking space Pnow represented by the vehicle position information signal S21 when the terminal ECU 190 receives the vehicle position information signal S21 transmitted from the vehicle ECU 290.

In addition, the terminal ECU 190 displays the pulling-out remaining distance image G53 on the display 110 to indicate the distance represented by the pulling-out remaining distance signal S23 when the terminal ECU 190 receives the pulling-out remaining distance signal S23 transmitted from the vehicle ECU 290.

The vehicle ECU 290 transmits one or more sonar signals S18 to the outside of the vehicle 200 when the vehicle ECU 290 recognizes one or more objects existing within the predetermined distance Dth, based on one or more signals sent from one or more clearance sonars 278 while the vehicle ECU 290 executes the remote pulling-out control. The sonar signal S18 is a signal representing the clearance sonar 278 which sends the signal representing the objects existing within the predetermined distance Dth.

As shown in FIG. 14, the terminal ECU 190 displays one or more sonar images G58 on a portion of the operation terminal 100 near the vehicle image G52 when the terminal ECU 190 receives one or more sonar signals S18. The sonar image G58 is an image indicating the clearance sonar 278 represented by the sonar signal S18 relative to the vehicle image G52.

A manner of displaying the sonar images G58 in automatically pulling the vehicle 200 out of the present parking space Pnow by the remote pulling-out control is the same as the manner of displaying the sonar images G58 in automatically parking the vehicle 200 in the target parking space Pin_tgt by the remote parking control.

In this regard, the manner of displaying the sonar images G58 in automatically pulling the vehicle 200 out of the present parking space Pnow by the remote pulling-out control may be different from the manner of displaying the sonar images G58 in automatically parking the vehicle 200 in the target parking space Pin_tgt by the remote parking control Further, the operation terminal 100 may be configured to generate the alert sound in addition to displaying the sonar images G58 in automatically pulling the vehicle 200 out of the present parking space Pnow by the remote pulling-out control in a manner similar to the manner in automatically parking the vehicle 200 in the target parking space Pin_tgt by the remote parking control.

Furthermore, the operation terminal 100 may be configured to generate the alert sound in addition to displaying the sonar images G58 in automatically pulling the vehicle 200 out of the present parking space Pnow in a manner different from the manner in automatically parking the vehicle 200 in the target parking space Pin_tgt by the remote parking control.

The terminal ECU 190 stops transmitting the control execution command signal S16 to the outside of the operation terminal 100 when the pulling-out touch interaction condition Cout becomes unsatisfied, for example, in response to the user taking the finger off the touch interaction portion P54.

The vehicle ECU 290 stops the vehicle 200 by the friction brake mechanisms 231 when the vehicle ECU 290 does not receive the control execution command signal S16.

The vehicle ECU 290 ends the execution of the remote pulling-out control by (i) locking the wheels of the vehicle 200 by the parking brake 233, (ii) unlocking the doors of the vehicle 200 by the door lock mechanism 250, and (iii) stopping activating the vehicle movement devices such as the cameras 277, the engine 210, the first motor generator 221, and the second motor generator 222 necessary to drive the vehicle 200 when the vehicle 200 arrives at the target pulling-out place Pout_tgt, and the pulling-out process to automatically pull the vehicle 200 out of the present parking space Pnow is completed.

In addition, the vehicle ECU 290 transmits a pulling-out completed signal S24 to the outside of the vehicle 200 when the pulling-out process to automatically pull the vehicle 200 out of the present parking space Pnow is completed. The pulling-out completed signal S24 represents that the pulling-out process to automatically pull the vehicle 200 out of the present parking space Pnow is completed.

Figure 15:
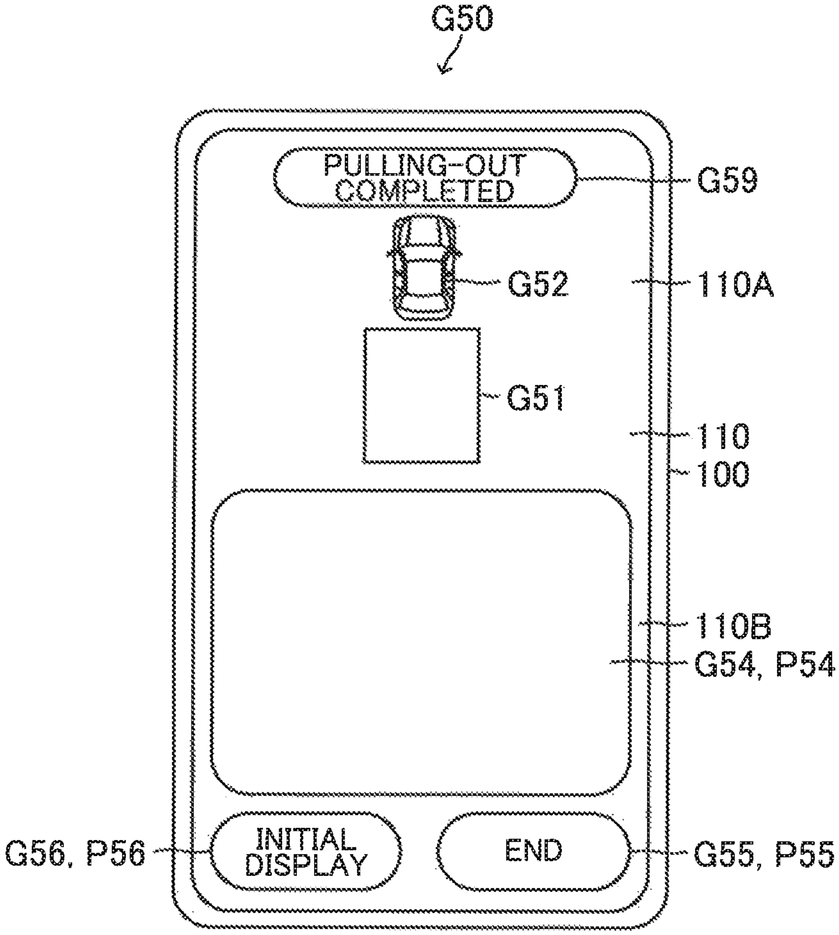
FIG. 15 is a view for showing the operation terminal which indicates the pulling-out touch interaction image on the display.

As shown in FIG. 15, the terminal ECU 190 displays a pulling-out completed image G59 on the display 110 when the terminal ECU 190 receives the pulling-out completed signal S24 transmitted from the vehicle ECU 290. The pulling-out completed image G59 is an image indicating that the pulling-out process to automatically pull the vehicle 200 out of the present parking space Pnow is completed. The pulling-out completed image G59 is displayed at the uppermost area of the display 110.

In the embodiment movement system 10, the pulling-out touch interaction condition Cout is the condition Clout that the number of the sharp curves or the sharp bends in the path of the movement of the user's finger touching the touch interaction portion P54 for the predetermined length of time T1out is greater than or equal to the predetermined number N1out.

Therefore, a possibility that the movement of the user's finger touching the touch interaction portion P54 satisfies the pulling-out touch interaction condition Cout is extremely small when the user mistakenly touches the touch interaction portion P54 with the user's finger. Thus, a possibility that the remote pulling-out control is executed is extremely small when the user mistakenly touches the touch interaction portion P54 with the user's finger. Therefore, with the embodiment movement system 10, it can be ensured that the remote pulling-out control is executed only when the user has the intention of automatically pulling the vehicle 200 out of the present parking space Pnow.

Further, a possibility that the terminal ECU 190 recognizes that the movement of the user's finger satisfies the pulling-out touch interaction condition Cout is extremely small when the user does not touch the touch interaction portion P54 with the user's finger, but the terminal ECU 190 recognizes that the user touches the touch interaction portion P54 with the user's finger due to the problems in the contact sensing function of the display 110. Thus, the possibility that the remote pulling-out control is executed is extremely small when the user does not touch the touch interaction portion P54 with the user's finger, but the terminal ECU 190 recognizes that the user touches the touch interaction portion P54 with the user's finger. Therefore, with the embodiment movement system 10, it can be ensured that the remote pulling-out control is executed only when the user has the intention of automatically pulling the vehicle 200 out of the present parking space Pnow.

Further, as described above, the pulling-out touch interaction condition Cout does not include the condition that the user's finger moves, touching the touch interaction portion P54 along the predetermined specific path (see FIGS. 9A, 9B, 9C, and 9D). Therefore, the user can automatically pull the vehicle 200 out of the present parking space Pnow by moving the finger on the touch interaction portion P54 in the random manner. In other words, the user's finger is not limited to moving, touching the touch interaction portion P54 along any specific paths for automatically pulling the vehicle 200 out of the present parking space Pnow. Thus, the user can cause the vehicle ECU 290 to execute the remote pulling-out control by the unlimited touch interaction. In addition, the user can easily perform the touch interaction satisfying the pulling-out touch interaction condition Cout when the user has to perform the touch interaction to touch the touch interaction portion P54 with the finger of the user's hand carrying the operation terminal 100.

Further, the user's finger is not limited to moving, touching the touch interaction portion P54 along any specific paths for automatically pulling the vehicle 200 out of the present parking space Pnow. Therefore, the user can perform the touch interaction satisfying the pulling-out touch interaction condition Cout without looking at the display 110. Thus, the user can easily confirm the situations relating to the movement of the vehicle 200 and the surroundings of the vehicle 200 with user's eyes directly.

<End of Application Software, Etc.>

The terminal ECU 190 ends an execution of the remote movement application software when the user performs the touch interaction to touch any one of portions P15, P25, P35, P45, and P55 of the display 110 corresponding to the application software end images G15, G25, G35, G45, and G55, respectively. Hereinafter, the portions P15, P25, P35, P45, and P55 of the display 110 will be referred to as "the application software end image portions P15, etc."

Further, the terminal ECU 190 displays the parking/pulling-out selection image G10 on the display 110 when the user performs the touch interaction to touch any of portions P26, P36, P46, and P56 of the display 110 corresponding to the initial display images G26, G36, G46, and G56, respectively. Hereinafter, the portions P26, P36, P46, and P56 of the display 110 will be referred to as "the initial display image portions P26, etc.".

Furthermore, the terminal ECU 190 transmits a control end command signal S25 for ending an execution of the remote movement control to the outside of the operation terminal 100 when the user performs the touch interaction to touch the application software end image portions P15, etc. with the user's finger. Also, the terminal ECU 190 transmits the control end command signal S25 to the outside of the operation terminal 100 when the user performs the touch interaction to touch the initial display image portions P16, etc. with the user's finger.

The vehicle ECU 290 ends the execution of the remote parking control or the remote pulling-out control by (i) stopping the movement of the vehicle 200 by the friction brake mechanisms 231, (ii) locking the wheels of the vehicle 200 by the parking brake 233, and (iii) stopping the activations of the vehicle movement devices such as the cameras 277, the engine 210, the first motor generator 221, and the second motor generator 222 necessary to drive the vehicle 200 when the vehicle ECU 290 receives the control end command signal S25 transmitted from the terminal ECU 190.

As described above, the embodiment movement system 10 is configured such that various signals are wirelessly communicated between the operation terminal 100 and the vehicle ECU 290.

Figure 16:
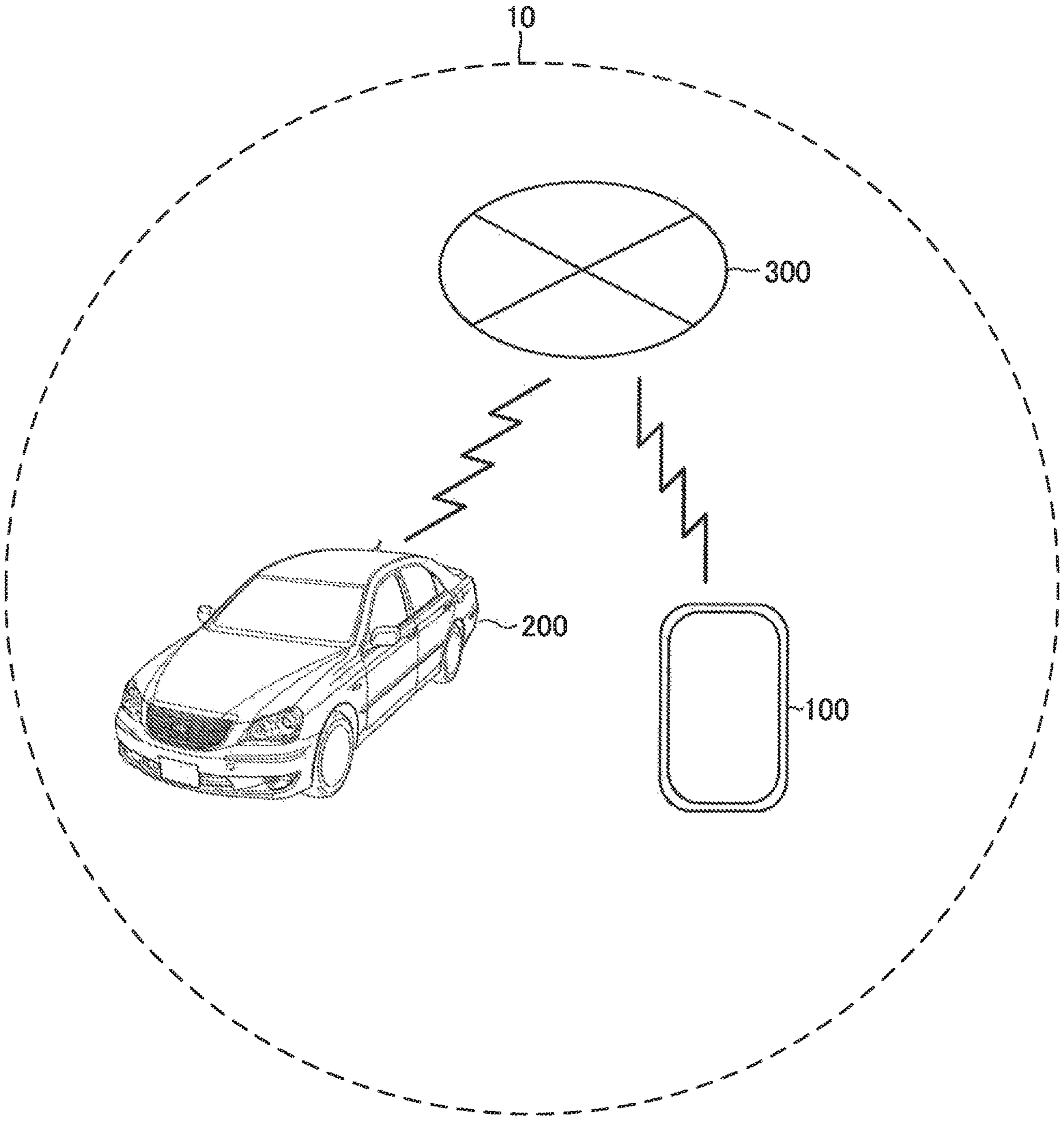
FIG. 16 is a view for showing the remote movement system according to a modified example of the embodiment of the invention.

In this regard, the embodiment movement system 10 may be configured to include the operation terminal 100, the vehicle 200 (in particular, the vehicle ECU 290), and the internet 300 as shown in FIG. 16 such that the various signals are communicated between the operation terminal 100 and the vehicle ECU 290 via the internet 300.

Figure 17:
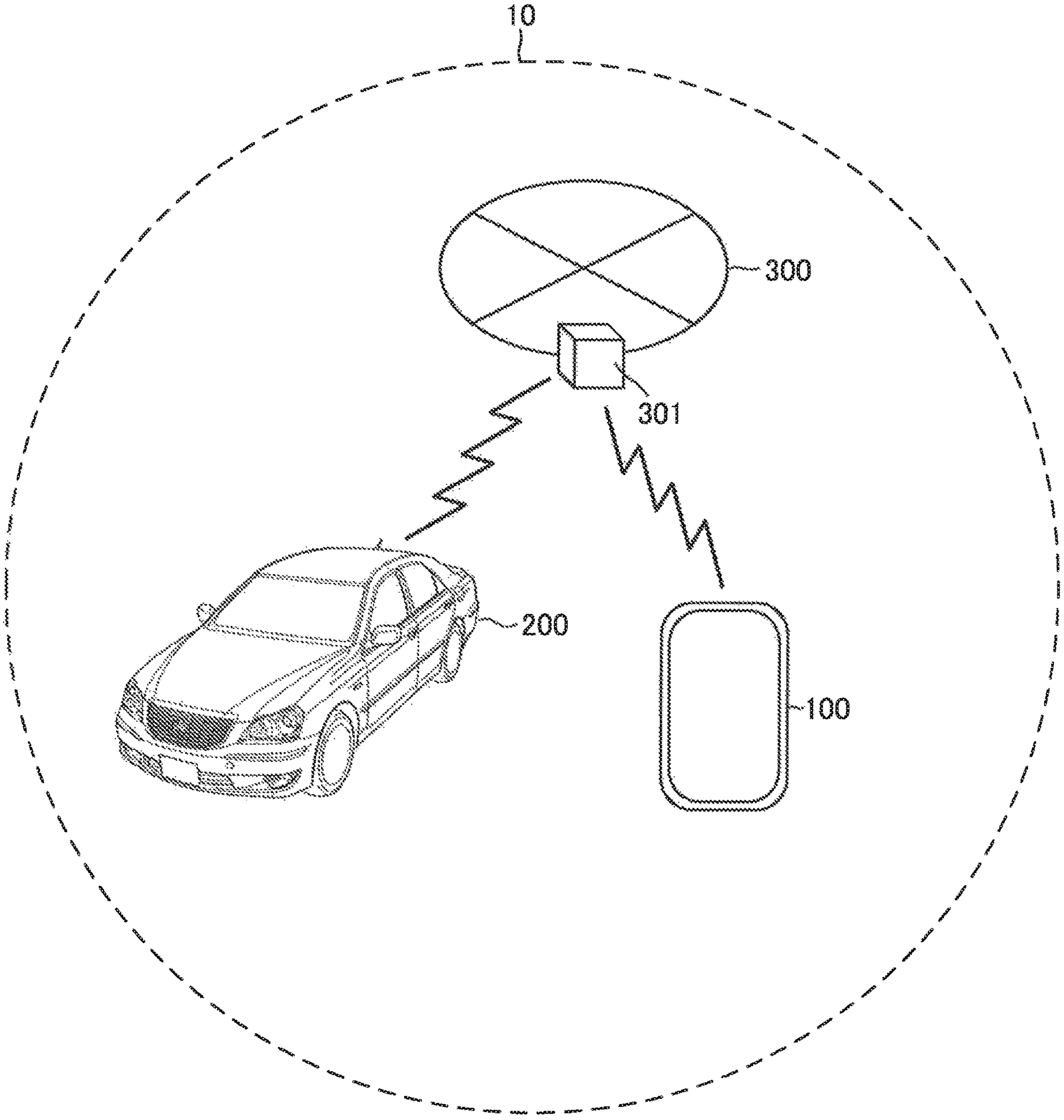
FIG. 17 is a view for showing the remote movement system according to another modified example of the embodiment of the invention.

Further, the embodiment movement system 10 may be configured to include the operation terminal 100, the vehicle 200 (in particular, the vehicle ECU 290), the internet 300, and a server 301 provided in the Internet 300 as shown in FIG. 17 such that the various signals are communicated between the operation terminal 100 and the vehicle ECU 290 via the internet 300 and the server 301.

Furthermore, the embodiment movement system 10 may be configured to include the operation terminal 100, the vehicle 200 (in particular, the vehicle ECU 290), the internet 300, and the server 301 (see FIG. 17) such that a part of functions realized by the remote movement application software installed in the terminal ECU 190 is realized by application software installed in the server 301.

Similarly, the embodiment movement system 10 may be configured to include the operation terminal 100, the vehicle 200 (in particular, the vehicle ECU 290), the internet 300, and the server 301 (see FIG. 17) such that a part of functions realized by the remote movement control installed in the vehicle ECU 290 is realized by application software installed in the server 301.

Further, the embodiment movement system 10 may be configured such that the remote movement application software installed in the terminal ECU 190 is updated by the server 301 when the embodiment movement system 10 includes the operation terminal 100, the vehicle 200 (in particular, the vehicle ECU 290), the internet 300, and the server 301 (see FIG. 17).

Similarly, the embodiment movement system 10 may be configured such that a program of the remote movement control installed in the vehicle ECU 290 is updated by the server 301 when the embodiment movement system 10 includes the operation terminal 100, the vehicle 200 (in particular, the vehicle ECU 290), the internet 300, and the server 301 (see FIG. 17).

<Specific Operation of Embodiment Movement System>

Next, a specific operation of the embodiment movement system 10 will be described. The CPU 191 of the terminal ECU 190 of the operation terminal 100 of the embodiment movement system 10 is configured or programmed to execute a routine shown by a flowchart in FIG. 18 each time a predetermined length of time elapses. Hereinafter, the CPU 191 will be referred to as "the terminal CPU 191".

Figure 18:
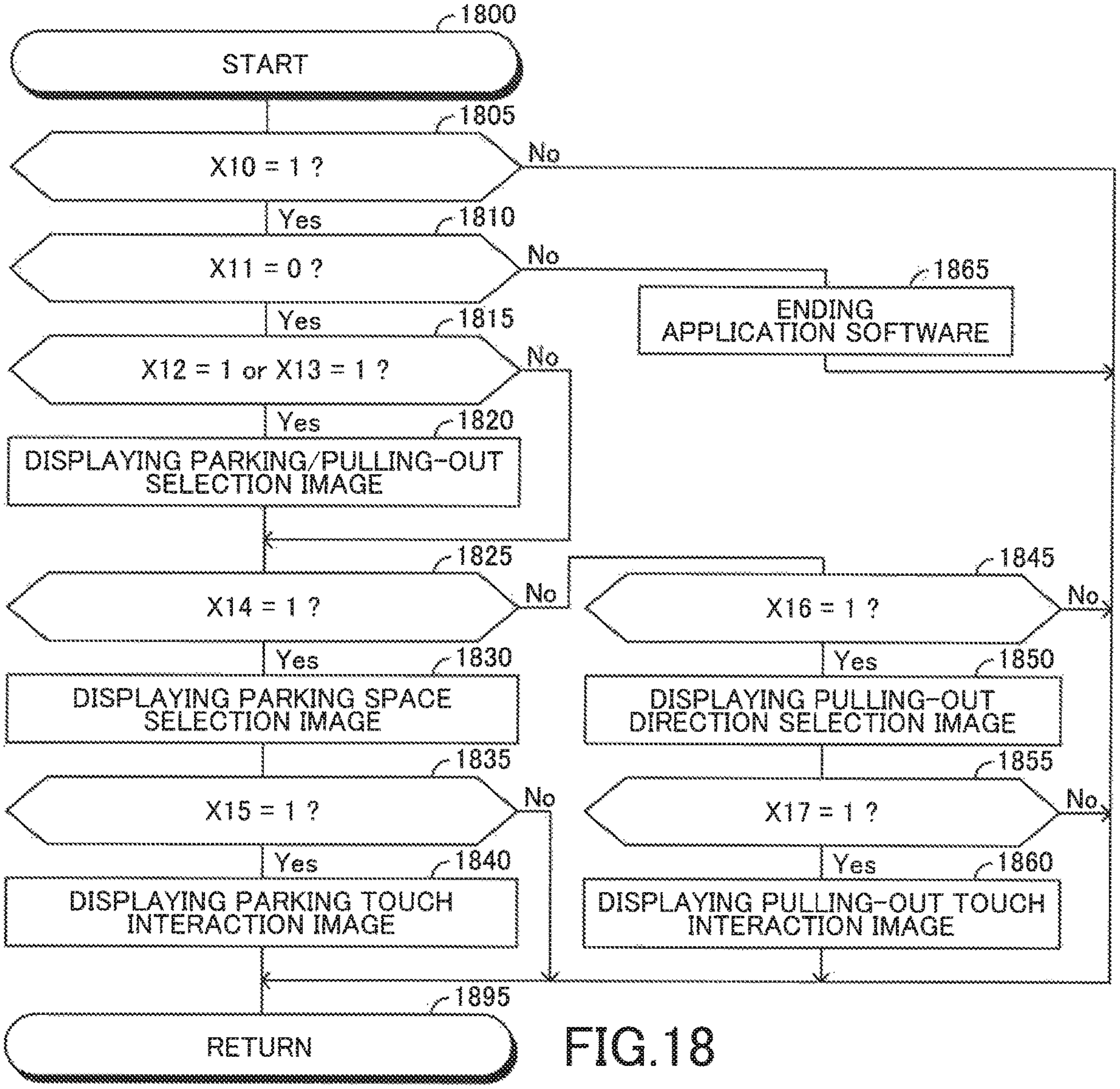
FIG. 18 is a view for showing a flowchart of a routine executed by a CPU of the ECU of the operation terminal shown in FIG. 1.

At a predetermined timing, the terminal CPU 191 starts a process from a step 1800 in FIG. 18 and then, proceeds with the process to a step 1805 to determine whether a value of an application software start-up flag X10 is "1". The value of the application software start-up flag X10 is set to "1" when the remote movement application software is started up. On the other hand, the value of the application software start-up flag X10 is set to "0" when the execution of the remote movement application software is ended.

When the value of the application software start-up flag X10 is "1", the terminal CPU 191 determines "Yes" at the step 1805 and then, proceeds with the process to a step 1810 to determine whether a value of a first application software end interaction flag X11 is "0". The value of the first application software end interaction flag X11 is set to "1" when the touch interaction to touch any of the application software end image portions P15, etc. with the user's finger is performed. On the other hand, the value of the first application software end interaction flag X11 is set to "0" when the remote movement application software is started up.

When the value of the first application software end interaction flag X11 is "0", the terminal CPU 191 determines "Yes" at the step 1810 and then, proceeds with the process to a step 1815 to determine whether any of values of a first application software start-up interaction flag X12 and a first initial display interaction flag X13 is "1". The value of the first application software start-up interaction flag X12 is set to "1" when the touch interaction for starting up the remote movement application software is performed by the user. On the other hand, the value of the first application software start-up interaction flag X12 is set to "0" when the parking/pulling-out selection image G10 is displayed on the display 110. The value of the first initial display interaction flag X13 is set to "1" when the touch interaction to touch any of the initial display image portions P26, etc. with the user's is performed. On the other hand, the value of the first initial display interaction flag X13 is set to "0" when the parking/pulling-out selection image G10 is displayed on the display 110.

When any of the values of the first application software start-up interaction flag X12 and the first initial display interaction flag X13 is "1", the terminal CPU 191 determines "Yes" at the step 1815 and then, executes a process of a step 1820 described below. Then, the terminal CPU 191 proceeds with the process to a step 1825.

Step 1820 *o* The terminal CPU 191 displays the parking/pulling-out selection image G10 on the display 110.

On the other hand, when the values of the first application software start-up interaction flag X12 and the first initial display interaction flag X13 are "0", respectively, the terminal CPU 191 determines "No" at the step 1815 and then, proceeds with the process to the step 1825 directly.

When the terminal CPU 191-proceeds with the process to the step 1825, the terminal CPU 191 determines whether a value of a parking selection flag X14 is "1". The value of the parking selection flag X14 is set to "1" when the touch interaction to touch the parking selection image portion P11 with the user's finger is performed. On the other hand, the value of the parking selection flag X14 is set to "0" when the touch interaction to touch any of the application software end image portions P15, etc. with the user's finger is performed. In addition, the value of the parking selection flag X14 is set to "0" when the touch interaction to touch any of the initial display image portions P26, etc. with the user's finger is performed.

When the value of the parking selection flag X14 is "1", the terminal CPU 191 determines "Yes" at the step 1825 and then, executes a process of a step 1830 described below. Then, the terminal CPU 191 proceeds with the process to a step 1835.

Step 1830 *a* The terminal CPU 191 displays the parking space selection image G20 on the display 110.

When the terminal CPU 191 proceeds with the process to the step 1835, the terminal CPU 191 determines whether a value of a first parking space selection flag X15 is "1". The value of the first parking space selection flag X15 is set to "1" when the touch interaction to touch the parking space image portion P21 with the user's finger is performed. On the other hand, the value of the first parking space selection flag X15 is set to "0" when the touch interaction to touch any of the application software end image portions P15, etc. with the user's finger is performed. Further, the value of the first parking space selection flag X15 is set to "0" when the touch interaction to touch any of the initial display image portions P26, etc. with the user's finger is performed.

When the value of the first parking space selection flag X15 is "1", the terminal CPU 191 determines "Yes" at the step 1835 and then, executes a process of a step 1840 described below. Then, the terminal CPU 191 proceeds with the process to a step 1895 to terminate this routine once.

Step 1840 *e* The terminal CPU 191 displays the parking touch interaction image G30 on the display 110. In addition, the terminal CPU 191 changes (i) a position of displaying the vehicle image G32, based on the vehicle position information signal S13 transmitted from the vehicle ECU 290, (ii) an indication of the parking remaining distance image G33, based on the parking remaining distance signal S15 transmitted from the vehicle ECU 290, and (iii) the movement direction image G37, based on the movement direction signal S17 transmitted from the vehicle ECU 290. In addition, the terminal CPU 191 displays one or more sonar images G38 corresponding to one or more clearance sonars 278 represented by one or more sonar signals S18 when the terminal CPU 191 receives one or more sonar signals S18 transmitted from the vehicle ECU 290.

On the other hand, when the value of the first parking space selection flag X15 is "0", the terminal CPU 191 determines "No" at the step 1835 and then, proceeds with the process to the step 1895 directly to terminate this routine once.

When the value of the parking selection flag X14 is "0" at a point of time of executing a process of the step 1825, the terminal CPU 191 determines "No" at the step 1825 and then, proceeds with the process to a step 1845 to determine whether a value of a pulling-out selection flag X16 is "1". The value of the pulling-out selection flag X16 is set to "1" when the touch interaction to touch the pulling-out selection image portion P12 with the user's finger is performed. On the other hand, the value of the pulling-out selection flag X16 is set to "0" when the touch interaction to touch any of the application software end image portions P15, etc. with the user's finger is performed. In addition, the value of the pulling-out selection flag X16 is set to "0" when the touch interaction to touch any of the initial display image portions P26, etc. with the user's finger is performed.

When the value of the pulling-out selection flag X16 is "1", the terminal CPU 191 determines "Yes" at the step 1845 and then, executes a process of a step 1850 described below. Then, the terminal CPU 191 proceeds with the process to a step 1855.

Step 1850: The terminal CPU 191 displays the pulling-out direction selection image G40 on the display 110.

When the terminal CPU 191 proceeds with the process to the step 1855, the terminal CPU 191 determines whether a value of a first pulling-out direction selection flag X17 is "1". The value of the first pulling-out direction selection flag X17 is set to "1" when the touch interaction to touch the candidate pulling-out direction image portion P43 with the user's finger is performed. On the other hand, the value of the first pulling-out direction selection flag X17 is set to "0" when the touch interaction to touch any of the application software end image portions P15, etc. with the user's finger is performed. In addition, the value of the first pulling-out direction selection flag X17 is set to "0" when the touch interaction to touch any of the initial display image portions P26, etc. with the user's finger is performed.

When the value of the first pulling-out direction selection flag X17 is "1", the terminal CPU 191 determines "Yes" at the step 1855 and then, executes a process of a step 1860 described below. Then, the terminal CPU 191 proceeds with the process to the step 1895 to terminate this routine once.

Step 1860: The terminal CPU 191 displays the pulling-out touch interaction image G50 on the display 110. In addition, the terminal CPU 191 changes (i) a position of displaying the vehicle image G52, based on the vehicle position information signal S21 transmitted from the vehicle ECU 290 and (ii) the indication of the pulling-out remaining distance image G53, based on the pulling-out remaining distance signal S23 transmitted from the vehicle ECU 290. In addition, the terminal CPU 191 displays one or more sonar images G58 corresponding to one or more clearance sonars 278 represented by one of more sonar signals S18 when the terminal CPU 191 receives one or more sonar signals S18 transmitted from the vehicle ECU 290.

On the other hand, when the value of the first pulling-out direction selection flag X17 is "0", the terminal CPU 191 determines "No" at the step 1845 and then, proceeds with the process to the step 1895 directly to terminate this routine once.

When the value of the pulling-out selection flag X16 is "0" at a point of time of executing a process of the step 1845, the terminal CPU 191 determines "No" at the step 1845 and then, proceeds with the process to the step 1895 directly to terminate this routine once.

When the value of the first application software end interaction flag X11 is "1" at a point of time of executing a process of the step 1810, the terminal CPU 191 determines "No" at the step 1810 and then, executes a process of a step 1865 described below. Then, the terminal CPU 191 proceeds with the process to the step 1895 to terminate this routine once.

Step 1865: The terminal CPU 191 ends the execution of the remote movement application software.

When the value of the application software start-up flag X10 is "0" at a point of time of executing a process of the step 1805, the terminal CPU 191 determines "No" at the step 1805 and then, proceeds with the process to the step 1895 directly to terminate this routine once.

Figure 19:
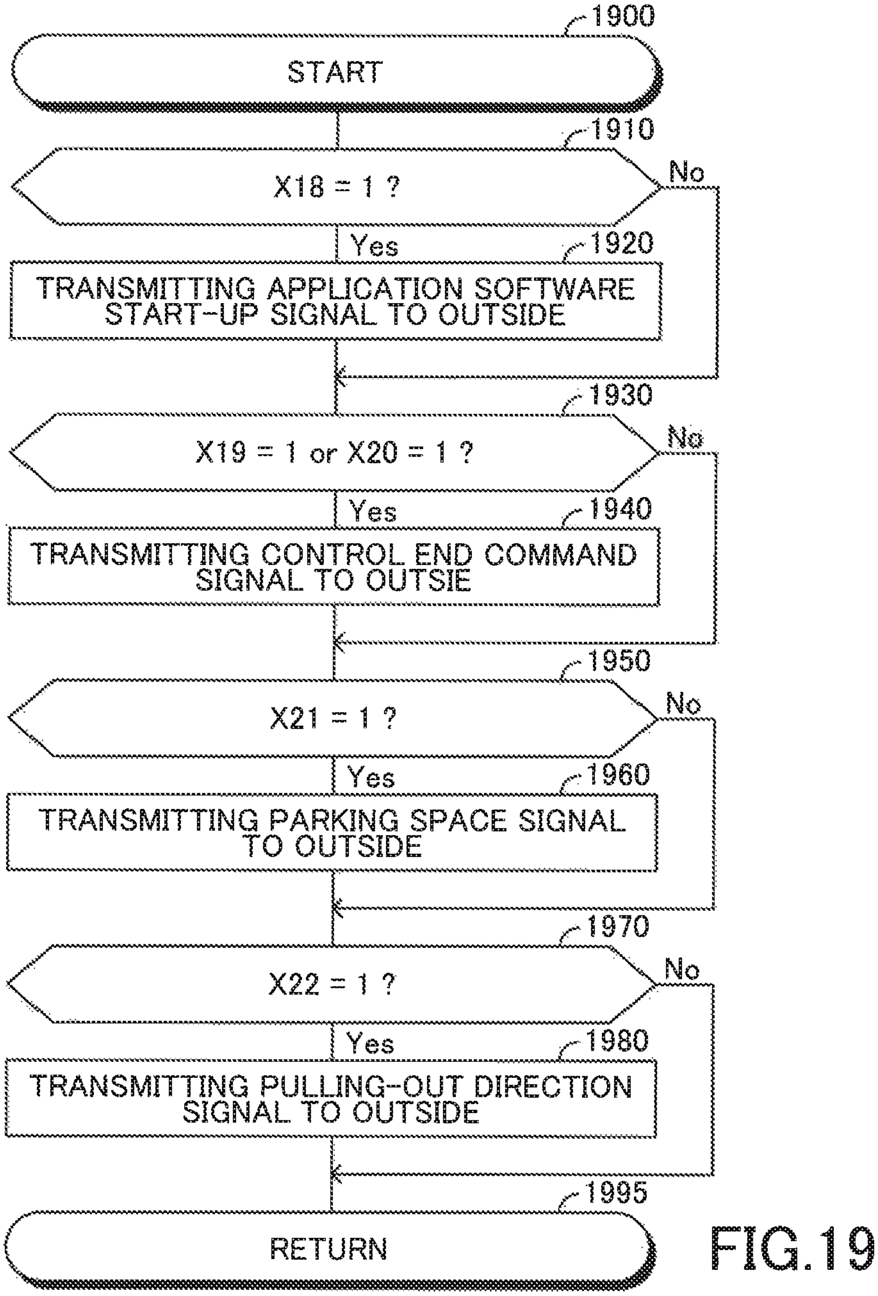
FIG. 19 is a view for showing a flowchart of a routine executed by the CPU of the ECU of the operation terminal shown in FIG. 1.

In addition, the terminal CPU 191 is configured or programmed to execute a routine shown by a flowchart in FIG. 19 each time the predetermined length of time elapses.

At a predetermined timing, the terminal CPU 191 starts a process from a step 1900 in FIG. 19 and then, proceeds with the process to a step 1910 to determine whether a value of a second application software start-up interaction flag X18 is '1'. The value of the second application software start-up interaction flag X18 is set to "1" when the touch interaction for starting up the remote movement application software is performed by the user. On the other hand, the value of the second application software start-up interaction flag X18 is set to "0" when the application software start-up signal S10 is transmitted from the terminal CPU 191 to the outside of the operation terminal 100.

When the value of the second application software start-up interaction flag X18 is "1", the terminal CPU 191 determines "Yes" at the step 1910 and then, executes a process of a step 1920 described below. Then, the terminal CPU 191 proceeds with the process to a step 1930.

Step 1920: The terminal CPU 191 transmits the application software start-up signal S10 to the outside of the operation terminal 100.

On the other hand, when the value of the second application software start-up interaction flag X18 is "0", the terminal CPU 191 determines "No" at the step 1910 and then, proceeds with the process to the step 1930 directly.

When the terminal CPU 191 proceeds with the process to the step 1930, the terminal CPU 191 determines whether any of values of a second application software end interaction flag X19 and a second initial display interaction flag X20 is "1", The value of the second application software end interaction flag X19 is set to "1" when the touch interaction to touch any of the application software end image portion P15, etc. with the user's finger is performed. On the other hand, the value of the second application software end interaction flag X19 is set to "0" when the control end command signal S25 is transmitted from the terminal CPU 191 to the outside of the operation terminal 100. The value of the second initial display interaction flag X20 is set to "1" when the touch interaction to touch any of the initial display image portions P26, etc. with the user's finger is performed. On the other hand, the value of the second initial display interaction flag X20 is set to "0" when the control end command signal S25 is transmitted from the terminal CPU 191 to the outside of the operation terminal 100.

When any of the values of the second application software end interaction flag X19 and the second initial display interaction flag X20 is "1", the terminal CPU 191 determines "Yes" at the step 1930 and then, executes a process of a step 1940 described below. Then, the terminal CPU 191 proceeds with the process to a step 1950.

Step 1940: The terminal CPU 191 transmits the control end command signal S25 to the outside of the operation terminal 100.

On the other hand, when the values of the second application software end interaction flag X19 and the second initial display interaction flag X20 are "0", respectively, the terminal CPU 191 determines "No" at the step 1930 and then, proceeds with the process to the step 1950 directly.

When the terminal CPU 191 proceeds with the process to the step 1950, the terminal CPU 191 determines whether a value of a second parking space selection flag X21 is "1". The value of the second parking space selection flag X21 is set to "1" when the touch interaction to touch the parking space image portion P21 with the user's finger is performed. On the other hand, the value of the second parking space selection flag X21 is set to "0" when the parking space signal S14 is transmitted from the terminal CPU 191 to the outside of the operation terminal 100.

When the value of the second parking space selection flag X21 is "1", the terminal CPU 191 determines "Yes" at the step 1950 and then, executes a process of a step 1960 described below. Then, the terminal CPU 191 proceeds with the process to a step 1970.

Step 1960 *e* The terminal CPU 191 transmits the parking space signal S14 to the outside of the operation terminal 100.

On the other hand, when the value of the second parking space selection flag X21 is "0", the terminal CPU 191 determines "No" at the step 1950 and then, proceeds with the process to the step 1970 directly.

When the terminal CPU 191 proceeds with the process to the step 1970, the terminal CPU 191 determines whether a value of a second pulling-out direction selection flag X22 is "1". The value of the second pulling-out direction selection flag X22 is set to "1" when the touch interaction to touch the candidate pulling-out direction image portion P43 with the user's finger is performed. On the other hand, the value of the second pulling-out direction selection flag X22 is set to "0" when the pulling-out direction signal S22 is transmitted from the terminal CPU 191 to the outside of the operation terminal 100.

When the value of the second pulling-out direction selection flag X22 is "1", the terminal CPU 191 determines "Yes" at the step 1970 and then, executes a process of a step 1980 described below. Then, the terminal CPU 191 proceeds with the process to a step 1995 to terminate this routine once.

Step 1980: The terminal CPU 191 transmits the pulling-out direction signal S22 to the outside of the operation terminal 100.

On the other hand, when the value of the second pulling-out direction selection flag X22 is "0", the terminal CPU 191 determines "No" at the step 1970 and then, proceeds with the process to the step 1995 directly to terminate this routine once.

Figure 20:
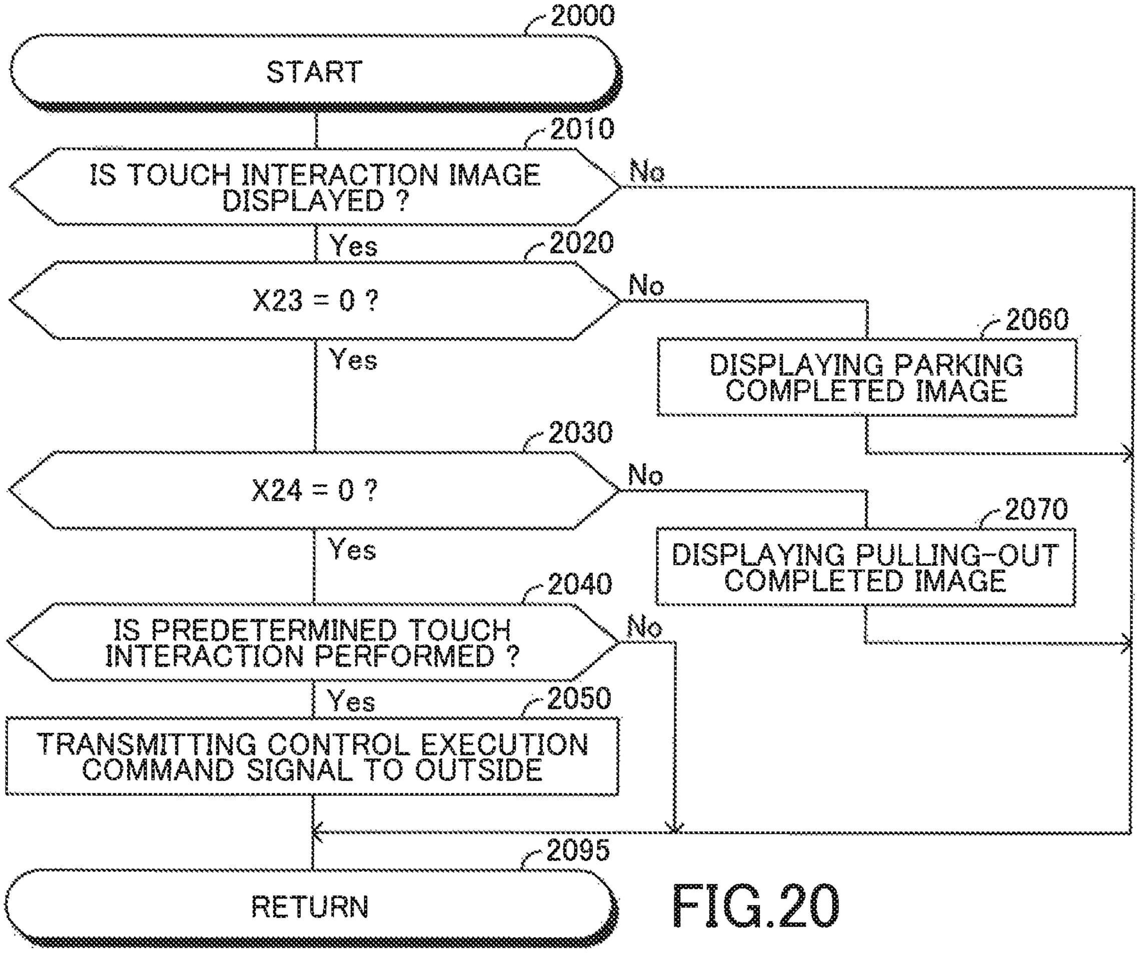
FIG. 20 is a view for showing a flowchart of a routine executed by the CPU of the ECU of the operation terminal shown in FIG. 1.

In addition, the terminal CPU 191 is configured or programmed to execute a routine shown by a flowchart in FIG. 20 each time the predetermined length of time elapses.

At a predetermined timing, the terminal CPU 191 starts a process from a step 2000 in FIG. 20 and then, proceeds with the process to a step 2010 to determine whether any of the parking touch interaction image G30 and the pulling-out touch interaction image G50 is displayed on the display 110.

When any of the parking touch interaction image G30 and the pulling-out touch interaction image G50 is displayed on the display 110, the terminal CPU 191 determines "Yes" at the step 2010 and then, proceeds with the process to a step 2020 to determine whether a value of a parking completed signal flag X23 is "0". The value of the parking completed signal flag X23 is set to "1" when the terminal CPU 191 receives the parking completed signal S19 transmitted from the vehicle ECU 290. On the other hand, the value of the parking completed signal flag X23 is set to "0" when the touch interaction to touch any of the application software end image portions P15, etc. with the user's finger is performed. In addition, the value of the parking completed signal flag X23 is set to "0" when the touch interaction to touch any of the initial display image portions P26, etc. with the user's finger is performed.

When the value of the parking completed signal flag X23 is "0", the terminal CPU 191 determines "Yes" at the step 2020 and then, proceeds with the process to a step 2030 to determine whether a value of a pulling-out completed signal flag X24 is "0". The value of the pulling-out completed signal flag X24 is set to "1" when the terminal CPU 191 receives the pulling-out completed signal S24 transmitted from the vehicle ECU 290. On the other hand, the value of the pulling-out completed signal flag X24 is set to "0" when the touch interaction to touch any of the application software end image portions P15, etc. with the user's finger is performed. In addition, the value of the pulling-out completed signal flag X24 is set to "0" when the touch interaction to touch any of the initial display image portions P26, etc. with the user's finger is performed.

When the value of the pulling-out completed signal flag X24 is "0", the terminal CPU 191 determines "Yes" at the step 2030 and then, proceeds with the process to a step 2040 to determine whether the touch interaction satisfying any of the parking touch interaction condition Cin and the pulling-out touch interaction condition Cout is performed, i.e., the predetermined touch interaction is performed.

When the predetermined touch interaction is performed, the terminal CPU 191 determines "Yes" at the step 2040 and then, executes a process of a step 2050 described below. Then, the terminal CPU 191 proceeds with the process to a step 2095 to terminate this routine once.

Step 2050: The terminal CPU 191 transmits the control execution command signal S16 to the outside of the operation terminal 100.

On the other hand, when the predetermined touch interaction is not performed, the terminal CPU 191 determines "No" at the step 2040 and then, proceeds with the process to the step 2095 directly to terminate this routine once. In this case, the control execution command signal S16 is not transmitted from the terminal CPU 191.

When the value of the pulling-out completed signal flag X24 is "1" at a point of time of executing a process of the step 2030, the terminal CPU 191 determines "No" at the step 2030 and then, executes a process of a step 2070 described below. Then, the terminal CPU 191 proceeds with the process to the step 2095 to terminate this routine once.

Step 2070: The terminal CPU 191 displays the pulling-out completed image G59 on the display 110.

When the value of the parking completed signal flag X23 is "1" at a point of time of executing a process of the step 2020, the terminal CPU 191 determines "No" at the step 2020 and then, executes a process of a step 2060 described below. Then, the terminal CPU 191 proceeds with the process to the step 2095 to terminate this routine once.

Step 2060 *e* The terminal CPU 191 displays the parking completed image G39 on the display 110.

When the parking touch interaction image G30 and the pulling-out touch interaction image G50 are not displayed on the display 110 at a point of time of executing a process of the step 2010, the terminal CPU 191 determines "No" at the step 2010 and then, proceeds with the process to the step 2095 directly to terminate this routine once.

Figure 21:
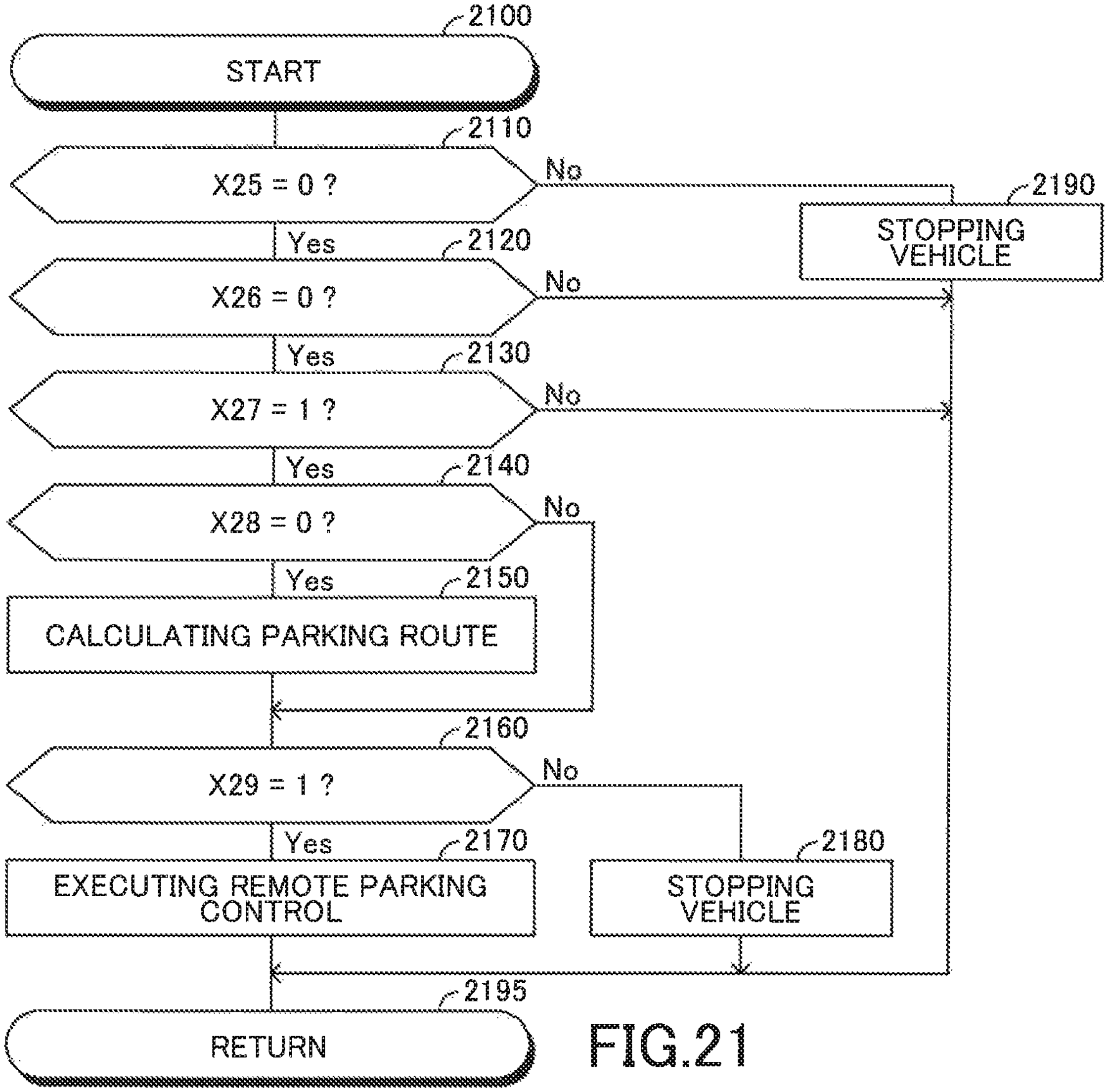
FIG. 21 is a view for showing a flowchart of a routine executed by a CPU of the ECU of the vehicle shown in FIG. 1.

The CPU 291 of the vehicle ECU 290 is configured or programmed to execute a routine shown by a flowchart in FIG. 21 each time the predetermined length of time elapses. Hereinafter, the CPU 291 will be referred to as "the vehicle CPU 291".

At a predetermined timing, the vehicle CPU 291 starts a process from a step 2100 in FIG. 21 and then, proceeds with the process to a step 2110 to determine whether a value of a control end command flag X25 is "0". The value of the control end command flag X25 is set to "1" when the vehicle CPU 291 receives the control end command signal S25 transmitted from the terminal CPU 191. On the other hand, the value of the control end command flag X25 is set to "0" when the vehicle CPU 291 receives the application software start-up signal S10 transmitted from the terminal CPU 191.

When the value of the control end command flag X25 is "0", the vehicle CPU 291 determines "Yes" at the step 2110 and then, proceeds with the process to a step 2120 to determine whether a value of a parking completed flag X26 is "0". The value of the parking completed flag X26 is set to "1" when the parking process to automatically park the vehicle 200 in the target parking space Pin_tgt is completed. On the other hand, the value of the parking completed flag X26 is set to "0" when the vehicle CPU 291 receives the control end command signal S25 transmitted from the terminal CPU 191.

When the value of the parking completed flag X26 is "0", the vehicle CPU 291 determines "Yes" at the step 2120 and then, proceeds with the process to a step 2130 to determine whether a value of a parking space signal flag X27 is "1". The value of the parking space signal flag X27 is set to "1" when the vehicle CPU 291 receives the parking space signal S14 transmitted from the terminal CPU 191. On the other hand, the value of the parking space signal flag X27 is set to "0" when the vehicle CPU 291 receives the control end command signal S25 transmitted from the terminal CPU 191.

When the value of the parking space signal flag X27 is "1", the vehicle CPU 291 determines "Yes" at the step 2130 and then, proceeds with the process to a step 2140 to determine whether a value of a parking route calculation completed flag X28 is "0". The value of the parking route calculation completed flag X28 is set to "1" when the calculation of the parking route is completed. On the other hand, the value of the parking route calculation completed flag X28 is set to "0" when the vehicle CPU 291 receives the control end command signal S25 transmitted from the terminal CPU 191.

When the value of the parking route calculation completed flag X28 is "0", the vehicle CPU 291 determines "Yes" at the step 2140 and then, executes a process of a step 2150 described below. Then, the vehicle CPU 291 proceeds with the process to a step 2160.

Step 2150: The vehicle CPU 291 calculates the parking route.

On the other hand, when the value of the parking route calculation completed flag X28 is "1", the vehicle CPU 291 determines "No" at the step 2140 and then, proceeds with the process to the step 2160 directly.

When the vehicle CPU 291 proceeds with the process to the step 2160, the vehicle CPU 291 determines whether a value of a control execution command signal flag X29 is "1". The value of the control execution command signal flag X29 is set to "1" when the vehicle CPU 291 receives the control execution command signal S16 transmitted from the terminal CPU 191. On the other hand, the value of the control execution command signal flag X29 is set to "0" when the vehicle CPU 291 does not receive the control execution command signal S16.

When the value of the control execution command signal flag X29 is "1", the vehicle CPU 291 determines "Yes" at the step 2160 and then, executes a process of a step 2170 described below. Then, the vehicle CPU 291 proceeds with the process to a step 2195 to terminate this routine once.

Step 2170: The vehicle CPU 291 executes the remote parking control. As described above, the vehicle CPU 291 stops the movement of the vehicle 200 by the friction brake mechanisms 231, locks the wheels of the vehicle 200 by the parking brake 233, and locks the doors of the vehicle 200 by the door lock mechanism 250 when the vehicle 200 arrives at the target parking space Pin_tgt.

On the other hand, when the value of the control execution command signal flag X29 is "0", the vehicle CPU 291 determines "No" at the step 2160 and then, executes a process of a step 2180 described below. Then, the vehicle CPU 291 proceeds with the process to the step 2195 to terminate this routine once.

Step 2180: The vehicle CPU 291 brakes the vehicle 200 by the friction brake mechanisms 231 to stop the movement of the vehicle 200.

When the value of the parking space signal flag X27 is "0" at a point of time of executing a process of the step 2130, the vehicle CPU 291 determines "No" at the step 2130 and then, proceeds with the process to the step 2195 directly to terminate this routine once.

When the value of the parking completed flag X26 is "1" at a point of time of executing a process of the step 2120, the vehicle CPU 291 determines "No" at the step 2120 and then, proceeds with the process to the step 2195 directly to terminate this routine once.

When the value of the control end command flag X25 is "1" at a point of time of executing a process of the step 2110, the vehicle CPU 291 determines "No" at the step 2110 and then, executes a process of a step 2190 described below. Then, the vehicle CPU 291 proceeds with the process to the step 2195 to terminate this routine once.

Step 2190: The vehicle CPU 291 brakes the vehicle 200 by the friction brake mechanisms 231 to stop the movement of the vehicle 200 and locks the wheels of the vehicle 200 by the parking brake 233.

Figure 22:
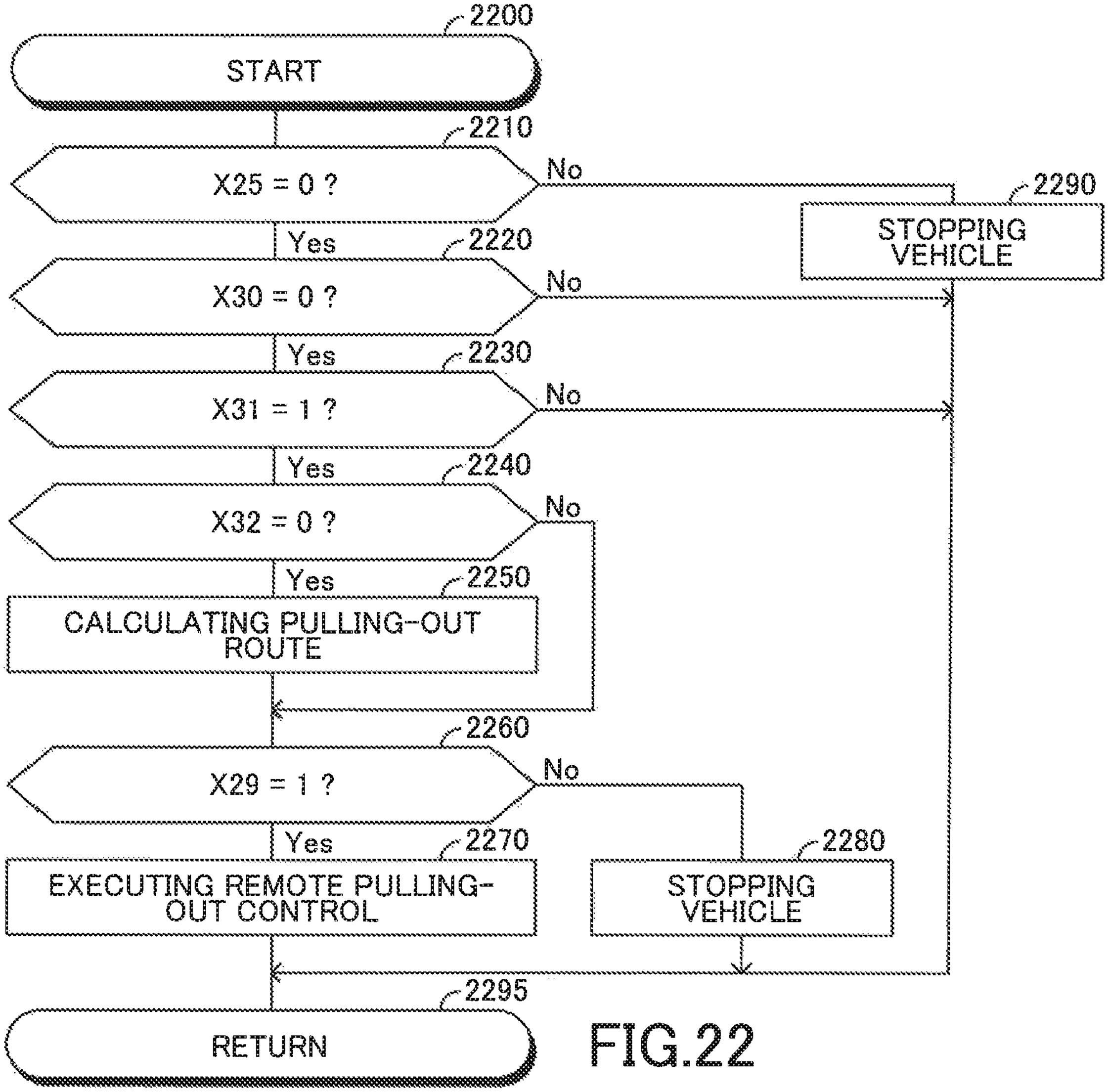
FIG. 22 is a view for showing a flowchart of a routine executed by the CPU of the ECU of the vehicle shown in FIG. 1.

In addition, the vehicle CPU 291 is configured or programmed to execute a routine shown by a flowchart in FIG. 22 each time the predetermined length of time elapses.

At a predetermined timing, the vehicle CPU 291 starts a process from a step 2200 in FIG. 22 and then, proceeds with the process to a step 2210 to determine whether the value of the control end command flag X25 is "0".

When the value of the control end command flag X25 is "0", the vehicle CPU 291 determines "Yes" at the step 2210 and then, proceeds with the process to a step 2220 to determine whether a value of a pulling-out completed flag X30 is "0".

The value of the pulling-out completed flag X30 is set to "1" when the pulling-out process to automatically pull the vehicle 200 out of the present parking space Pnow is completed. On the other hand, the value of the pulling-out completed flag X30 is set to "0" when the vehicle CPU 291 receives the control end command signal S25 transmitted from the terminal CPU 191.

When the value of the pulling-out completed flag X30 is "0", the vehicle CPU 291 determines "Yes" at the step 2220 and then, proceeds with the process to a step 2230 to determine whether a value of a pulling-out direction signal flag X31 is "1". The value of the pulling-out direction signal flag X31 is set to "1" when the vehicle CPU 291 receives the pulling-out direction signal S22 transmitted from the terminal CPU 191. On the other hand, the value of the pulling-out direction signal flag X31 is set to "0" when the vehicle CPU 291 receives the control end command signal S25 transmitted from the terminal CPU 191.

When the value of the pulling-out direction signal flag X31 is "1", the vehicle CPU 291 determines "Yes" at the step 2230 and then, proceeds with the process to a step 2240 to determine whether a value of a pulling-out route calculation completed flag X32 is "0". The value of the pulling-out route calculation completed flag X32 is set to "1" when the calculation of the pulling-out route is completed. On the other hand, the value of the pulling-out route calculation completed flag X32 is set to "0" when the vehicle CPU 291 receives the control end command signal S25 transmitted from the terminal CPU 191.

When the value of the pulling-out route calculation completed flag X32 is "0", the vehicle CPU 291 determines "Yes" at the step 2240 and then, executes a process of a step 2250 described below. Then, the vehicle CPU 291 proceeds with the process to a step 2260.

Step 2250: The vehicle CPU 291 calculates the pulling-out route.

On the other hand, when the value of the pulling-out route calculation completed flag X32 is "1", the vehicle CPU 291 determines "No" at the step 2240 and then, proceeds with the process to the step 2260 directly.

When the vehicle CPU 291 proceeds with the process to the step 2260, the vehicle CPU 291 determines whether the value of the control execution command signal flag X29 is "1".

When the value of the control execution command signal flag X29 is "1", the vehicle CPU 291 determines "Yes" at the step 2260 and then, executes a process of a step 2270 described below. Then, the vehicle CPU 291 proceeds with the process to a step 2295 to terminate this routine once.

Step 2270: The vehicle CPU 291 executes the remote pulling-out control. As described above, the vehicle CPU 291 stops the movement of the vehicle 200 by the friction brake mechanisms 231, locks the wheels of the vehicle 200 by the parking brake 233, and unlocks the doors of the vehicle 200 by the door lock mechanism 250 when the vehicle 200 arrives at the target pulling-out place Pout_tgt.

On the other hand, when the value of the control execution command signal flag X29 is "0", the vehicle CPU 291 determines "No" at the step 2260 and then, executes a process of a step 2280 described below. Then, the vehicle CPU 291 proceeds with the process to the step 2295 to terminate this routine once.

Step 2280: The vehicle CPU 291 brakes the vehicle 200 by the friction brake mechanisms 231 to stop the movement of the vehicle 200.

When the value of the pulling-out direction signal flag X31 is "0" at a point of time of executing a process of the step 2230, the vehicle CPU 291 determines "No" at the step 2230 and then, proceeds with the process to the step 2295 directly to terminate this routine once.

When the value of the pulling-out completed flag X30 is "1" at a point of time of executing a process of the step 2220, the vehicle CPU 291 determines "No" at the step 2220 and then, proceeds with the process to the step 2295 directly to terminate this routine once.

When the value of the control end command flag X25 is "1" at a point of time of executing a process of the step 2210, the vehicle CPU 291 determines "No" at the step 2210 and then, executes a process of a step 2290 described below. Then, the vehicle CPU 291 proceeds with the process to the step 2295 to terminate this routine once.

Step 2290: The vehicle CPU 291 brakes the vehicle 200 by the friction brake mechanisms 231 to stop the movement of the vehicle 200 and locks the wheels of the vehicle 200 by the parking brake 233.

Figure 23:
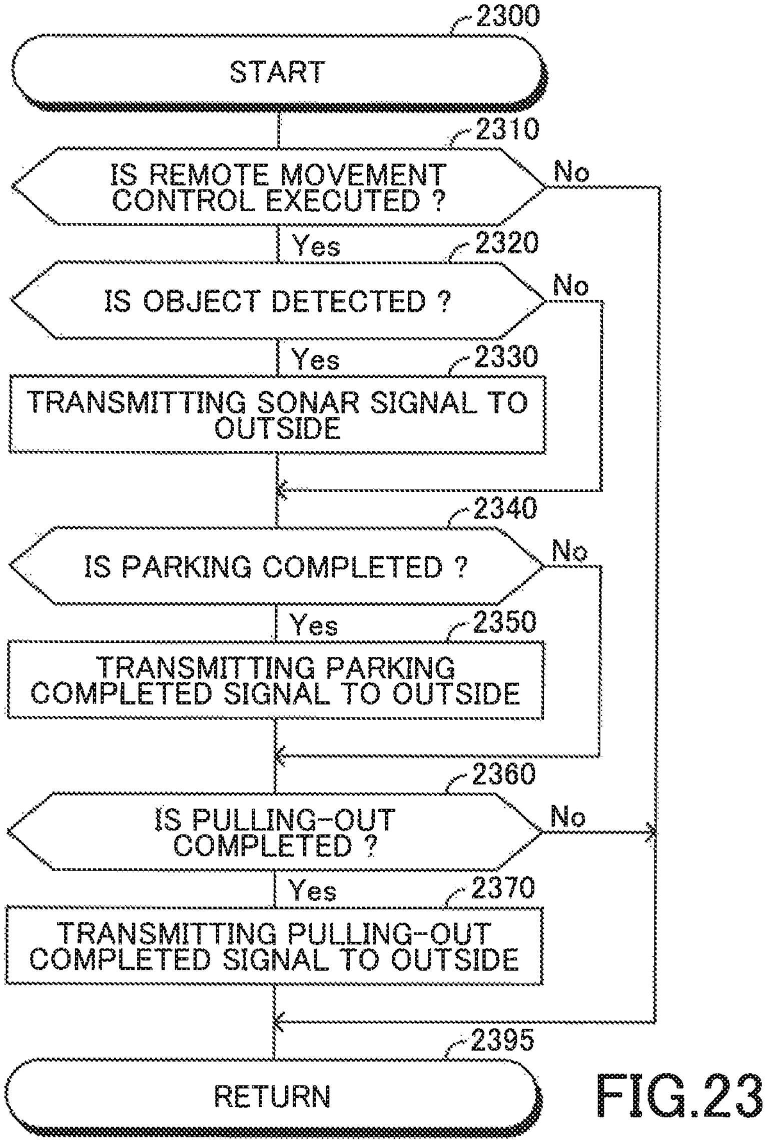
FIG. 23 is a view for showing a flowchart of a routine executed by the CPU of the ECU of the vehicle shown in FIG. 1.

In addition, the vehicle CPU 291 is configured or programmed to execute a routine shown by a flowchart in FIG. 23 each time the predetermined length of time elapses.

At a predetermined timing, the vehicle CPU 291 starts a process from a step 2300 in FIG. 23 and then, proceeds with the process to a step 2310 to determine whether the remote movement control is executed.

When the remote movement control is executed, the vehicle CPU 291 determines "Yes" at the step 2310 and then, proceeds with the process to a step 2320 to determine whether one or more objects are detected within the predetermined distance Dth from the vehicle 200 by one or more clearance sonars 278.

When one or more objects are detected within the predetermined distance Dth from the vehicle 200 by one or more clearance sonars 278, the vehicle CPU 291 determines "Yes" at the step 2320 and then, executes a process of a step 2330 described below. Then, the vehicle CPU 291 proceeds with the process to a step 2340.

Step 2330: The vehicle CPU 291 transmits one or more sonar signals S18 representing one or more clearance sonars 278 which detect the objects within the predetermined distance Dth from the vehicle 200.

On the other hand, when no object is detected within the predetermined distance Dth from the vehicle 200 by the clearance sonars 278, the vehicle CPU 291 determines "No" at the step 2320 and then, proceeds with the process to the step 2340 directly.

When the vehicle CPU 291 proceeds with the process to the step 2340, the vehicle CPU 291 determines whether the parking process to automatically park the vehicle 200 in the target parking space Pin_tgt is completed.

When the parking process to automatically park the vehicle 200 in the target parking space Pin_tgt is completed, the vehicle CPU 291 determines "Yes" at the step 2340 and then, executes a process of a step 2350 described below. Then, the vehicle CPU 291 proceeds with the process to a step 2360.

Step 2350: The vehicle CPU 291 transmits the parking completed signal S19 to the outside of the vehicle 200.

On the other hand, when the parking process to automatically park the vehicle 200 in the target parking space Pin_tgt is not completed, the vehicle CPU 291 determines "No" at the step 2340 and then, proceeds with the process to the step 2360 directly.

When the vehicle CPU 291 proceeds with the process to the step 2360, the vehicle CPU 291 determines whether the pulling-out process to automatically pull the vehicle 200 out of the present parking space Pnow is completed.

When the pulling-out process to automatically pull the vehicle 200 out of the present parking space Pnow, the vehicle CPU 291 determines "Yes" at the step 2360 and then, executes a process of a step 2370 described below. Then, the vehicle CPU 291 proceeds with the process to a step 2395 to terminate this routine once.

Step 2370: The vehicle CPU 291 transmits the pulling-out completed signal S24 to the outside of the vehicle 200.

On the other hand, when the pulling-out process to automatically pull the vehicle 200 out of the present parking space Pnow is not completed, the vehicle CPU 291 determines "No" at the step 2360 and then, proceeds with the process to the step 2395 directly to terminate this routine once.

When the remote movement control is not executed at a point of time of executing a process of the step 2310, the vehicle CPU 291 determines "No" at the step 2310 and then, proceeds with the process to the step 2395 directly to terminate this routine once.

The specific operation of the embodiment movement system 10 has been described. When the embodiment movement system 10 executes the routines shown in FIGS. 18 to 23, it can be ensured that the remote parking control is executed only when the user has the intention of automatically parking the vehicle 200 in the target parking space Pin_tgt. In addition, it can be ensured that the remote pulling-out control is executed only when the user has the intention of automatically pulling the vehicle 200 out of the present parking space Pnow.

In addition, the user can cause the embodiment movement system 10 to execute the remote movement control by the easy touch interaction. Further, the user can easily perform the touch interaction satisfying the parking touch interaction condition Cin or the pulling-out touch interaction condition Cout even when the user has to perform the touch interaction to touch the touch interaction portion P34 or the touch interaction portion P54 with the finger of the user's hand carrying the operation terminal 100. Furthermore, the user can easily confirm the situations relating to the movement of the vehicle 200 and the surroundings of the vehicle 200 with user's eyes directly.

It should be noted that the present invention is not limited to the aforementioned embodiment and various modifications can be employed within the scope of the present invention.

What is claimed is:

1. A remote movement system, comprising:

an operation terminal including:

a touch sensing portion which senses a finger of a user touching the touch sensing portion; and a terminal electronic control unit, including a processor that executes a program stored in a memory, configured to:

transmit a control execution command for requesting an execution of a remote movement control to cause a vehicle to move to a target position while the user's finger contactingly moves on the touch sensing portion along a random path; and a vehicle electronic control unit, including a processor that executes a program stored in a memory, provided in the vehicle, configured to:

during the remote movement control, stop the vehicle while the user's finger does not contactingly move on the touch sensing portion along the random path, wherein the random path includes at least one of the following satisfied conditions: (1) at least one sharp curve, wherein the at least one sharp curve occurs when a vector of the movement of the user's finger, on the touch sensing portion, changes by a predetermined angle or more; (2) a distance of the movement of the user's finger touching the touch sensing portion for a predetermined length of time is equal to or longer than a predetermined distance; and (3) a speed of the movement of the user's finger touching the touch sensing portion is maintained at a predetermined movement speed or more for a predetermined length of time or more.

2. The remote movement system as set forth in claim 1, wherein the operation terminal includes a display which displays images, and the terminal electronic control unit is configured to:

display the image defining a predetermined area as the touch sensing portion at a lower area of the display; and display the image indicating information on the vehicle caused to move by the remote movement control as an information image at an upper area of the display.

3. The remote movement system as set forth in claim 2, wherein the vehicle is provided with at least one sensor for detecting at least one obstacle against the movement of the vehicle, and the terminal electronic control unit is configured to (i) display at least one sensor image indicating the at least one sensor detecting the obstacle by color different from the color used for displaying the images other than the at least one sensor image at the upper area of the display as a part of the information image or (ii) display the at least one sensor image indicating the at least one sensor detecting the obstacle at the upper area of the display as a part of the information image with blinking the at least one sensor image.

4. The remote movement system as set forth in claim 2, wherein the terminal electronic control unit is configured to display the image indicating a distance between the vehicle and the target position at the upper area of the display as a part of the information image.

5. The remote movement system as set forth in claim 1, wherein the remote movement control is at least one of:

(i) a control to set a parking space as the target position and park the vehicle in the parking space set as the target position; and (ii) a control to set a position other than the parking space as the target position and cause the vehicle to move to the position set as the target position.

6. The remote movement system as set forth in claim 1, wherein the terminal electronic control unit and the vehicle electronic control unit are configured to wirelessly communicate with each other.

7. The remote movement system as set forth claim 1, wherein the terminal electronic control unit is configured to wirelessly communicate with internet and communicate with a server provided in the internet via the internet.

8. The remote movement system as set forth in claim 1, wherein the vehicle electronic control unit is configured to wirelessly communicate with internet and communicate with a server provided in the internet via the internet.

9. An operation terminal, comprising:

a touch sensing portion which senses a finger of a user touching the touch sensing portion; and a terminal electronic control unit, including a processor that executes remote movement application software stored in a memory, configured to cause a vehicle electronic control unit to execute a remote movement control to cause a vehicle to move to a target position, wherein the vehicle electronic control unit, including a processor that executes a program stored in a memory, is provided in the vehicle wherein the terminal electronic control unit is configured to transmit the control execution command when movement of the user's finger touching the touch sensing portion moves along a random path while touching the touch sensing portion, wherein the vehicle electronic control unit is configured to:

move the vehicle while the user's finger contactingly moves on the touch sensing portion, and stop the vehicle while the user's finger does not contactingly move on the touch sensing portion, wherein the random path includes at least one of the following satisfied conditions: (1) at least one sharp curve, wherein the at least one sharp curve occurs when a vector of the movement of the user's finger, on the touch sensing portion, changes by a predetermined angle or more; (2) a distance of the movement of the user's finger touching the touch sensing portion for a predetermined length of time is equal to or longer than a predetermined distance; and (3) a speed of the movement of the user's finger touching the touch sensing portion is maintained at a predetermined movement speed or more for a predetermined length of time or more.

10. The operation terminal as set forth in claim 9, wherein the operation terminal includes a display which displays images, and the terminal electronic control unit is configured to:

display the image defining a predetermined area as the touch sensing portion at a lower area of the display; and display the image indicating information on the vehicle caused to move by the remote movement control as an information image at an upper area of the display.

11. The operation terminal as set forth in claim 10, wherein the vehicle is provided with at least one sensor for detecting at least one obstacle against the movement of the vehicle, and the terminal electronic control unit is configured to (i) display at least one sensor image indicating the at least one sensor detecting the obstacle by color different from the color used for displaying the images other than the at least one sensor image at the upper area of the display as a part of the information image or (ii) display the at least one sensor image indicating the at least one sensor detecting the obstacle at the upper area of the display as a part of the information image with blinking the at least one sensor image.

12. The operation terminal as set forth in claim 10, wherein the terminal electronic control unit is configured to display the image indicating a distance between the vehicle and the target position at the upper area of the display as a part of the information image.

13. The operation terminal as set forth in claim 9, wherein the remote movement control is at least one of:

(i) a control to set a parking space as the target position and park the vehicle in the parking space set as the target position; and (ii) a control to set a position other than the parking space as the target position and cause the vehicle to move to the position set as the target position.

14. The operation terminal as set forth in claim 9, wherein the terminal electronic control unit is configured to wirelessly communicate with the vehicle electronic control unit.

15. The operation terminal as set forth in claim 9, wherein the terminal electronic control unit is configured to wirelessly communicate with internet and communicate with a server provided in the internet via the internet.

* * * * *